United States Patent
Pilu et al.

(10) Patent No.: US 6,975,434 B1
(45) Date of Patent: Dec. 13, 2005

(54) METHOD AND APPARATUS FOR SCANNING OVERSIZED DOCUMENTS

(75) Inventors: Maurizio Pilu, Bristol (GB); Stephen Bernard Pollard, Dursley (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 996 days.

(21) Appl. No.: 09/679,494

(22) Filed: Oct. 4, 2000

(30) Foreign Application Priority Data

Oct. 5, 1999 (EP) .................................. 99307839

(51) Int. Cl.⁷ .................. H04N 1/04; H04N 1/378; G06K 9/36; G06K 9/00
(52) U.S. Cl. .................. 358/474; 358/497; 358/450; 382/284; 382/318
(58) Field of Search .................. 358/497, 474, 358/487, 450, 452, 451, 449, 448, 528, 505, 358/506, 494, 488, 486, 473; 382/318, 319, 382/312, 284, 294, 313, 195, 190, 199; 250/234–236; 348/218.1

(56) References Cited

U.S. PATENT DOCUMENTS

| | | | | |
|---|---|---|---|---|
| 4,882,630 A | * | 11/1989 | Yamaguchi et al. | 358/451 |
| 5,465,163 A | | 11/1995 | Yoshihara et al. | 358/444 |
| 5,517,319 A | * | 5/1996 | Arai | 358/300 |
| 5,528,290 A | | 6/1996 | Saund | 348/218.1 |
| 5,604,819 A | | 2/1997 | Barnard | 382/151 |
| 5,611,033 A | | 3/1997 | Pitteloud et al. | 345/629 |
| 5,625,720 A | | 4/1997 | Miyaza et al. | 382/284 |
| 5,644,411 A | | 7/1997 | Tamagaki et al. | 358/529 |
| 5,721,624 A | * | 2/1998 | Kumashiro et al. | 358/450 |
| 6,002,492 A | * | 12/1999 | Kamon et al. | 358/450 |
| 6,005,681 A | | 12/1999 | Pollard | 358/473 |
| 6,078,410 A | | 6/2000 | Adachi | 358/522 |
| 6,249,616 B1 | | 6/2001 | Hashimoto | 382/284 |
| 6,507,415 B1 | * | 1/2003 | Toyoda et al. | 358/450 |
| 6,571,024 B1 | | 5/2003 | Sawhney et al. | 382/294 |
| 6,690,482 B1 | * | 2/2004 | Toyoda et al. | 358/1.2 |

FOREIGN PATENT DOCUMENTS

| | | |
|---|---|---|
| EP | 0 718 807 | 6/1996 |
| EP | 0 743 784 | 11/1996 |

OTHER PUBLICATIONS

U.S. Appl. No. 09/679,493, filed Oct. 4, 2000, Pilu et al.

* cited by examiner

*Primary Examiner*—Cheukfan Lee

(57) ABSTRACT

An image capture apparatus comprises a computer device, for example a personal computer, and a scanning device, for example a flat bed scanning device, configured to operate a two-scan image capture process followed by data processing for combining first and second images obtained in said two-step image capture process, and a three-step image capture process followed by data processing for combining first, second and third images obtained in said three-step image capture process for obtaining a combined full image of a document. Algorithms are disclosed for stitching first and second images together to obtain a combined image data. In both the two-step and three-step image capture operation and subsequent data processing, a document having a size larger than an image capture area of said image capture device can be combined to produce a combined image data representing the whole of the document in a fully automated manner without the need for user intervention in matching images.

21 Claims, 19 Drawing Sheets

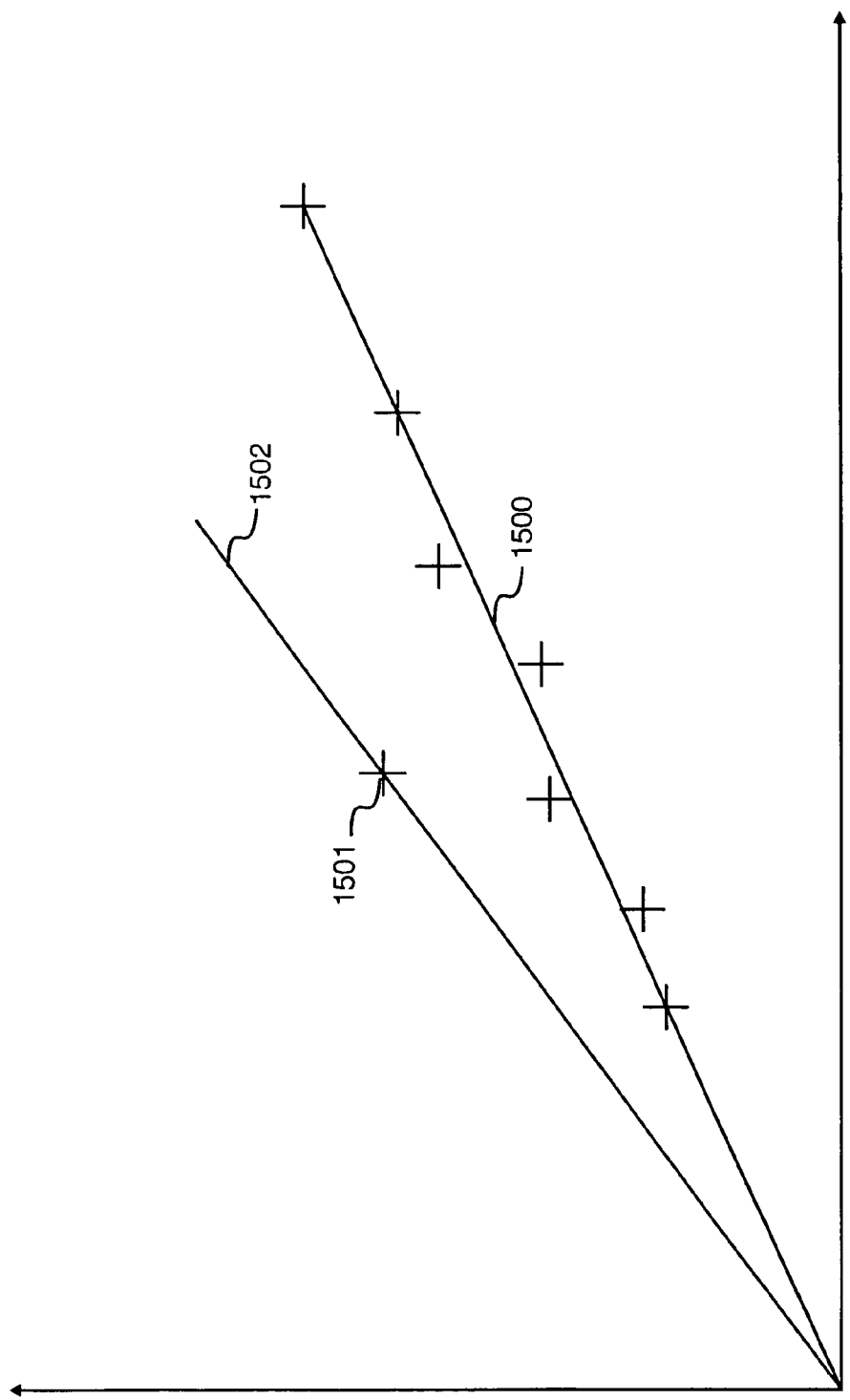

METHOD AND APPARATUS FOR SCANNING OVERSIZED DOCUMENTS

CROSS REFERENCE TO RELATED APPLICATION

This application is related to U.S. Ser. No. 09/679,494 filed Oct. 4, 2004 entitled "Method and Apparatus for Scanning Oversized Documents".

FIELD OF THE INVENTION

The present invention relates to scanning of documents, and particularly although not exclusively to a method and apparatus for scanning oversized documents on flat bed scanner devices.

BACKGROUND TO THE INVENTION

Conventional flat bed scanners, such as are used as peripheral devices to personal computers, are dominated in terms of volume of sales by scanners aimed for scanning A4 European standard size documents and US standard letter size documents.

Referring to FIG. 1 herein, there is illustrated schematically in perspective view a prior art scanner of a size and shape suitable for scanning A4 and US standard letter size documents. The prior art flat bed scanner comprises a casing 100 usually made of a plastics material, and generally of a rectangular shape, the casing having on an upper surface, a flat scanning bed comprising a transparent planar glass scan plate 101 of approximate dimensions of 35 cm×25 cm; a movable lid 102 hingedly attached to one end of the casing 100 which can be swung upwardly away from the scan plate 101 for allowing placement of documents directly on the scan plate 101, and which can then be lowered covering the document and scan plate for exclusion of light; a data transfer cable for transferring data to a main processing device, for example a personal computer; and a scanning mechanism contained within the casing 100 for scanning documents placed on the scan plate 101 and generating digital data signals representing a graphical information content of the document.

For scanning larger sized documents for example A3 or US legal documents which do not wholly fit onto the scan plate 101 there are known commercially available flatbed scanners having larger sized scan plates. However, commercially such larger sized flat bed scanners are relatively expensive, because the market for such scanners is far smaller than for A4 sized flat bed scanners. Therefore, economies of scale cannot be applied to larger sized scanners to the same extent as for A4/US letter size scanners. Further, the larger sized scanners have the disadvantage of physically larger size and are generally less convenient and more bulky than A4/US letter size scanners.

There are known prior art flat bed scanners having A4 and US letter sized scan plates which aim to scan oversized documents having size larger than A4/US letter size by successfully scanning separate areas of an oversized document in successive scans, and then stitching together successive sets of image data received in the successive scans to produce a scan image data representing the full sized document. An example of a prior art image processor which aims to scan documents larger than a scan plate is found in U.S. Pat. No. 5,465,163 in which the problem of scanning large size originals such as maps, CAD drawings, A1 size, B1 size, A0 size and the like is addressed.

However, U.S. Pat. No. 5,465,163 does not disclose a practically workable specific algorithm or method for matching first and second image data of a document for producing a full image data representing a whole document of size larger than a scan plate. The algorithm used for matching first and second image data in U.S. Pat. No. 5,465,163 relies on low spatial frequencies in order to stitch together first and second image data. High spatial frequencies are ignored. Therefore, for images which have regular low spatial frequency information, and irregular variable high spatial frequency information, for example lines of text, the disclosed algorithm cannot differentiate between individual lines of text effectively, and in an automated manner. Thus, although the method disclosed in U.S. Pat. No. 5,465,163 may operate adequately for images such as photographs, it fails for various classes of images, in particular text. Additionally, the method disclosed in U.S. Pat. No. 5,465,163 requires a good initialization of first and second image data to be stitched together. That is to say, the first and second image data need to be almost matched initially in order for the algorithm to successfully stitch the first and second image data together. This involves a manual alignment of image data.

There exists a further prior art system in which a conventional A4 sized flat bed scanner is used to scan a first part of an oversized document, producing a first image data, following which a user moves the document on the scanner and a second part of the document is scanned in second scan operation, producing a second image data. Software is provided on a computer device which displays an image of both the first image data and the second image data on a visual display unit screen, wherein a user can match the first image data with the second image data by manipulation of a pointing device, e.g. a mouse or track ball, and by visually matching the first and second images displayed on the visual display unit.

However, this prior art system is cumbersome to use since it involves a high degree of user interaction in matching documents on screen visually. The system requires user skill, and is time consuming.

Prior art software is commercially available for matching images in successive scans. Examples of such software, which are available from Panaview and Photovista can deal with VGA-like image resolutions. However, this software cannot deal with standard 300 dpi A4/letter image sizes, and is aimed primarily at documents having pictures or images other than text. This prior art software is unsuitable for large size documents containing textual matter, since the amount of computational power required by the prior art algorithm means that they will not work on large documents using textual matter, and this cannot be solved by using data processors having higher data processing capacity which are feasible for commercial usage. The methods used in such software are fundamentally inadequate for image processing of text on large sized documents.

SUMMARY OF THE INVENTION

One object of the specific implementations of the present invention is to extend the range of sizes of document which can be scanned using a flat bed scanner without making major modifications to hardware components of the scanner.

Another object of specific implementations according to the present invention is to provide fully automated matching of image data produced by successive scans of a scanner device which is relatively fast and requires little or no user intervention and little or no skill from a user, to enable an image data of an oversized document to be generated automatically.

A third object of specific implementations of the present invention is to provide a document imaging solution specifically aimed at large documents, relative to A4 and US letter size which gives high performance, precision and a use model which is consistent with user expectations from a scanning device, being as simple as possible, and requiring no intervention from the user other than document placement and activation of an image capture apparatus.

A fourth object of specific implementations of the present invention is to provide a robust scanning solution aimed at oversized documents, particularly although not exclusively textual documents having a data content of 24 Mbytes or above.

According to a first aspect of the present invention, there is provided a method of operating an image capture apparatus comprising at least one processor; at least one memory means, and an image capture device having an image capture area in which images placed in said area are captured as digital image data, to capture a document image having physical area greater than said image capture area, said method comprising the steps of:

receiving an input instruction signal instructing said apparatus to adopt an image capture mode, in which said apparatus captures a first image data followed by a second image data;

capturing said first image data, said first image data corresponding with a first portion of said document;

capturing said second image data, said second image data corresponding with a second portion of said document, wherein said first and second portions of said document comprise a whole of one side of said document;

processing said first image data to adjust a scale of said first image data;

processing said first image data to detect features of said first image data;

processing said second image data to adjust a scale of said second image data;

matching said first image data with said second image data;

combining said first and second image data to produce a combined full image data representing said image having greater physical area than said image capture area.

Preferably, the method further comprises waiting a predetermined period after said capture of said first image data.

According to a second aspect of the present invention, there is provided a method of using a flat bed image capture apparatus having an image capture area in which images placed in said area are captured as digital image data, said image capture area being of a first substantially quadrilateral shape having first and second shorter edges opposing each other, and third and fourth longer edges opposing each other and extending between said first and second shorter edges, for capturing a document image of an area of one side of a two sided document, said area having a second substantially quadrilateral shape of area greater than said image capture area, said document image area having first and second shorter document edges opposing each other, and third and fourth longer document edges opposing each other and extending between said first and second document edges, said method comprising the steps of:

positioning said first edge of said document substantially abutting said first edge of said image capture area such that said document is placed on said image capture area in a first orientation such that a first portion of said document overlaps said image capture area;

activating said image capture apparatus to perform a first image capture operation for capturing a first image data of said document in said first orientation;

repositioning said document relative to said image capture area such that said document is placed in a second orientation in which a second portion of said document overlaps said image capture area.

Said step of repositioning said document into said second orientation may comprise rotating said document such that said second edge of said document substantially abuts said first edge of said image capture area in a second orientation of said document relative to said image capture area.

activating said image capture apparatus to perform a second image capture operation for capture of a second image data of said document which overlaps said first image data.

Said step of rotating said document may comprise rotating said document by approximately 180°.

Said step of repositioning said document into said second orientation may comprise linearly translating said document relative to said image capture area.

According to a third aspect of the present invention, there is provided a method of operating an image capture apparatus comprising at least one processor, at least one memory means, and an image capture device having an image capture area in which images placed in said area are captured as digital image data, to capture a document image having physical area greater than said image capture area, said method comprising the steps of:

receiving an input instruction signal instructing said apparatus to adopt an image capture mode in which said apparatus captures a first image data followed by a second image data followed by a third image data;

capturing said first image data, said first image data corresponding with a first portion of said document;

capturing a second image data, said second image data corresponding with a second portion of said document;

capturing a third image data, said third image data corresponding with a third portion of said document, wherein said first and second and third portions of said document comprise a whole of one side of said document;

processing said first image data to adjust a scale of said first image data;

processing said second image data to adjust a scale of said second image data;

processing said third image data to adjust a scale of said third image data;

processing said first image data to detect features of said first image data;

matching said first image data with said second image data;

combining said first image data and said second image data to produce a first combined image data;

processing said second image data to detect features of said second image data;

matching said second image data with said third image data;

applying a transform to said matched second and third image data to produce a transform image data;

combining said transform image data with said first combined image data to produce a combined image data representing said document image having area greater than said image capture area.

Preferably, the method comprises the step of, prior to said step of capturing a first image data, configuring said image capture apparatus to perform a first image capture operation. Prior to said step of capturing a second image data, suitably, the image capture apparatus is configured to perform a second image capture operation.

Preferably, the method further comprises the step of, prior to said step of capturing a third image data, configuring said image capture apparatus to perform a third image capture operation.

Preferably Said Method Comprises:
after said step of capturing a first image data, waiting for a first user input before initiating said step of capturing a second image data; and
after said step of capturing a second image data, waiting for a second user input before initiating said step of capturing a third image data.

Preferably, said step of processing said first image data to adjust a scale of said first image data occurs simultaneously with said step of capturing said second image data.

Preferably, said step of processing said second image data to adjust the scale of said second image data is carried out simultaneously with said step of capturing a third image data.

Preferably, said step of processing said first image data to detect features of said first image data is carried out simultaneously with said step of capturing a second image data.

Preferably, said step of processing said second image data to detect features of said second image data is carried out simultaneously with said step of capturing a third image data.

Preferably, a said step of matching a said image data with another said image data is carried out simultaneously with a said step of capturing a said image data.

According to a fourth aspect of the present invention, there is provided a method of using a flat bed image capture apparatus having an image capture area in which images placed in said area are captured as digital image data, said image capture area being of a first substantially quadrilateral shape having first and second shorter edges opposing each other, and third and fourth longer edges opposing each other and extending between said first and second shorter edges, for capturing an image of an area of one side of a two sided document said area having a second substantially quadrilateral shape of area greater than said image capture area, said document area having first and second shorter document edges opposing each other, and third and fourth longer document edges opposing each other and extending between said first and second document edges, said method comprising the steps of:

positioning said document in a first orientation relative to said image capture area such that said first longest edge of said document is substantially parallel to said first shortest edge of said image capture area;
aligning said first shortest edge of said document with said first longest edge of said image capture area such that a first end portion of said document overlaps said image capture area;
activating said image capture apparatus to perform a first image capture operation for capturing a first image data of said document in said first orientation;
positioning said document in a second orientation in which said first longest edge of said document is substantially parallel to said first shortest edge of said image capture area, and a substantially central portion of said document overlaps said image capture area;
activating said image capture apparatus to perform a second image capture operation for capturing a second image data of said document in said second orientation;
positioning said document in a third orientation such that said first longest edge of said document is substantially parallel to said first shortest edge of said image capture area, and a said second shortest edge of said document lies adjacent said second longest edge of said image capture area, such that a third portion of said document corresponding to a second end of said document overlaps said image capture area; and
activating said image capture apparatus to perform a third image capture operation for capturing a third image data of said document in said third orientation.

Preferably said second and third orientations comprise linear translations of said document relative to said image capture area from said first orientation.

Preferably, said step of positioning said document in said first orientation is followed by said first activation step;
said second step of positioning said document follows said first activation step;
said second activation step follows said second positioning step;
said third positioning step follows said second activation step; and
said third activation step follows said third positioning step.

According to a fifth aspect of the present invention, there is provided an image capture apparatus comprising:
at least one data processing means;
at least one data storage means;
image capture means for capturing an image of an object presented in an image capture area of predetermined size;
a user interface for activating said image capture means to perform a series of image data capture operations; wherein said user interface comprises, means for activating said image capture apparatus to perform an operation for capture of two successive images in series, and means for activating said image capture apparatus to perform an operation for capture of three successive images in series; and
image processing means for processing a plurality of successive said captured images to combine said plurality of successive images into a combined image data representing a full image, of which said plurality of image data are sub-images.

Said user interface may comprise a plurality of switches operable by a human hand.

Said user interface may comprise a dialogue box displayed on a visual display unit, said dialogue box having selectable icons for selecting a two-step image capture process, and a three-step image capture process.

Where said user interface comprises a dialogue box displayed on a visual display unit comprising said apparatus, said user interface may comprise;
an icon for activating a first image capture operation of a two-step image capture process;
an icon for operating a second image capture process of said two-step image capture operation;
a visual display representing a positioning of a document a first step of said two-step image capture process; and
a display representing a positioning of said document for a second step of said two-step image capture process.

Said user interface may comprise:
an icon for activating a first step of a three-step image capture process;

an icon for activating a second step of a three-step image capture process;

an icon for activating a third step of said three-step image capture process;

a first icon representing graphically a positioning of a document on said image capture apparatus for performing said first step of said three-step image capture process;

a second icon representing a second positioning of said document for operation of a second step of said three-step image capture process; and a third icon representing a third positioning of said document for a third step of said three-step image capture process.

According to a sixth aspect of the present invention, there is provided an image capture apparatus comprising:

at least one data processing means;

at least one data storage means;

image capture means for capturing an image of an object presented in an image capture area of predetermined size;

a user interface for activating said image capture means to perform a series of image data capture operations; and image processing means for processing a succession of said captured images to combine said plurality of successive images into a combined image data representing a full image;

feature detection means for detecting a plurality of features of a said image data;

matching means for matching a first said image data with a second said image data; and combining means for combining a first said image data with a second said image data to produce a combined image data representing an image captured partially by said first image data and partially by said second image data.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 15 illustrates schematically a process for rejecting a first matching data obtained by matching a first feature between a first image data and a second image data, where the first matching data does not coincide with a plurality of other matching data obtained from matching the same first and second image data;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
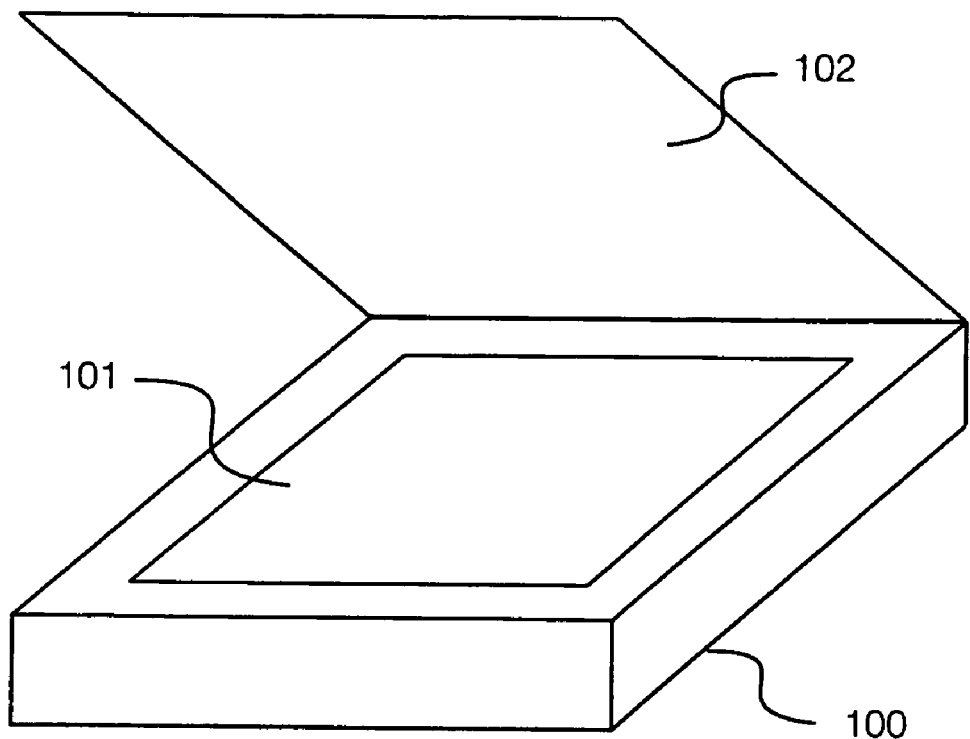
FIG. 1 illustrates schematically a prior art flat bed scanner device in perspective view.
Figure 2:
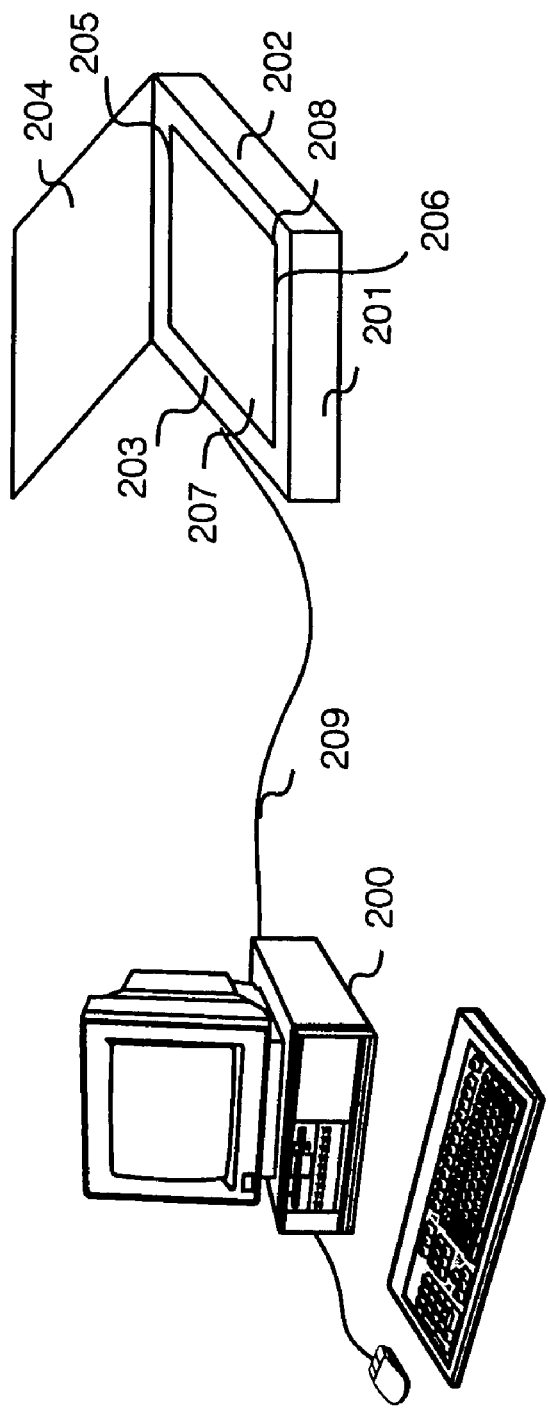
FIG. 2 illustrates schematically a scanning system comprising a computer entity and a flat bed scanning device according to a first specific implementation of the present invention.
Figure 3:
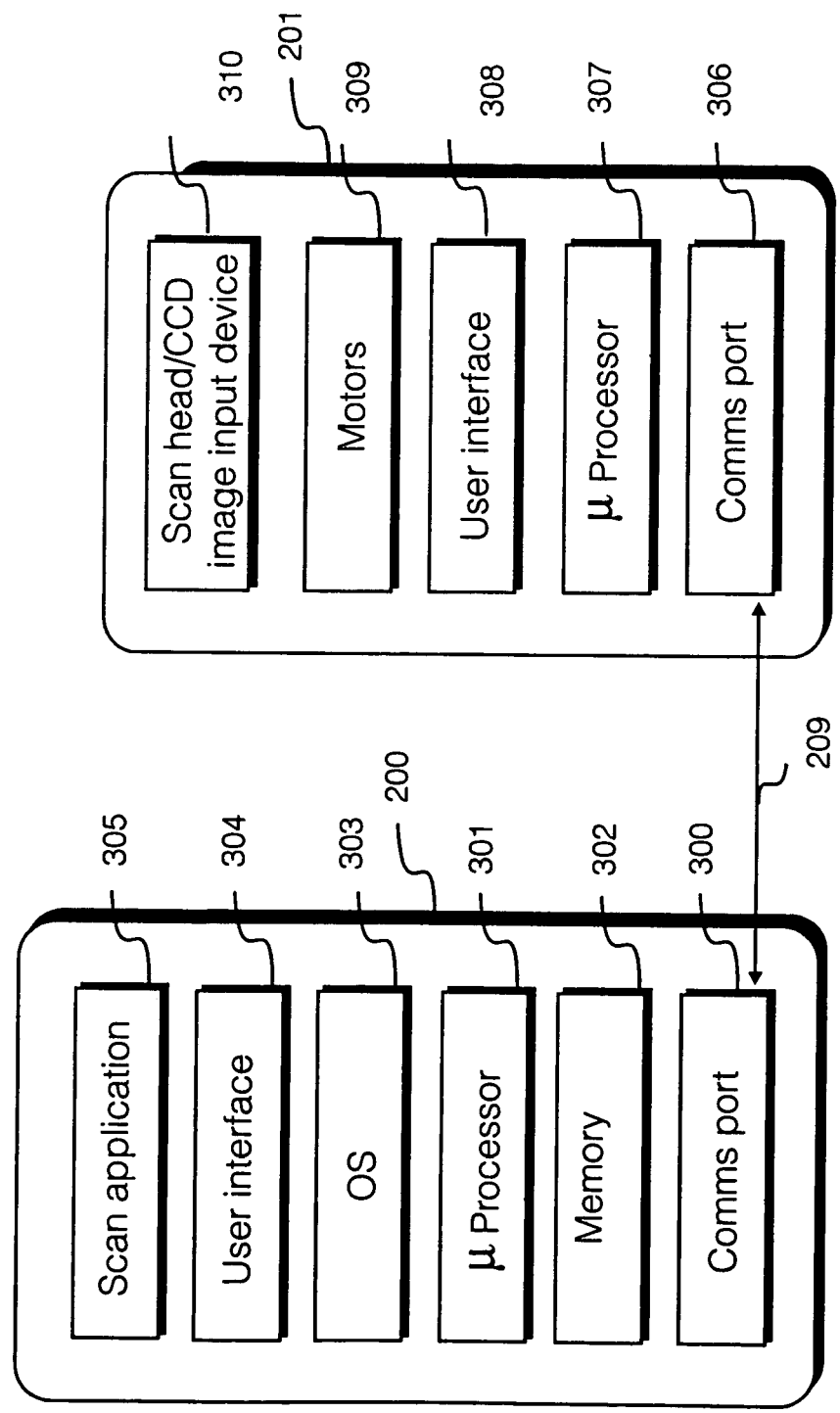
FIG. 3 illustrates schematically main architectural components of the scanning system illustrated in FIG. 2 herein above.

Referring to FIGS. 2 and 3 herein, there is illustrated schematically an apparatus and system for scanning and storing image data from oversized documents on a flat bed scanner. The apparatus comprises a computer 200 and a flat bed scanner 201, the computer having communications port 300, microprocessor 301, memory means 302, an operating system 303, a user interface 304, a scanning application 305; and a flat bed scanner 201 having a casing 202; a flat scan plate 203 being typically a planar sheet of glass; and a hinged lid 204 which can be swung upwards and away from the scan plate 203 for placement of a document on the scan plate and which may be detachable, and which can be placed over the document for the purpose of light exclusion when scanning. The scanner 201 comprises a communications port 306, a microprocessor 307, a user interface 308 optionally comprising a plurality of switches mounted on casing 202 providing various scan options, for example an A4 scan option, a US "letter" scan option, an A3 scan option, an A2 scan option, an A0 scan option, a B1 scan option, and a "percentage" key scan option whereby an area to be scanned can be selected as a percentage of an area of the glass scan plate; a set of drive motors 309 for operating a scan head within the casing and a charge couple delay "CCD" image input device 310. The scan plate has first and second opposing edges 205, 206 respectively and extending perpendicularly to said first and second edges, are third and fourth opposing edges 207, 208 respectively.

Figure 4:
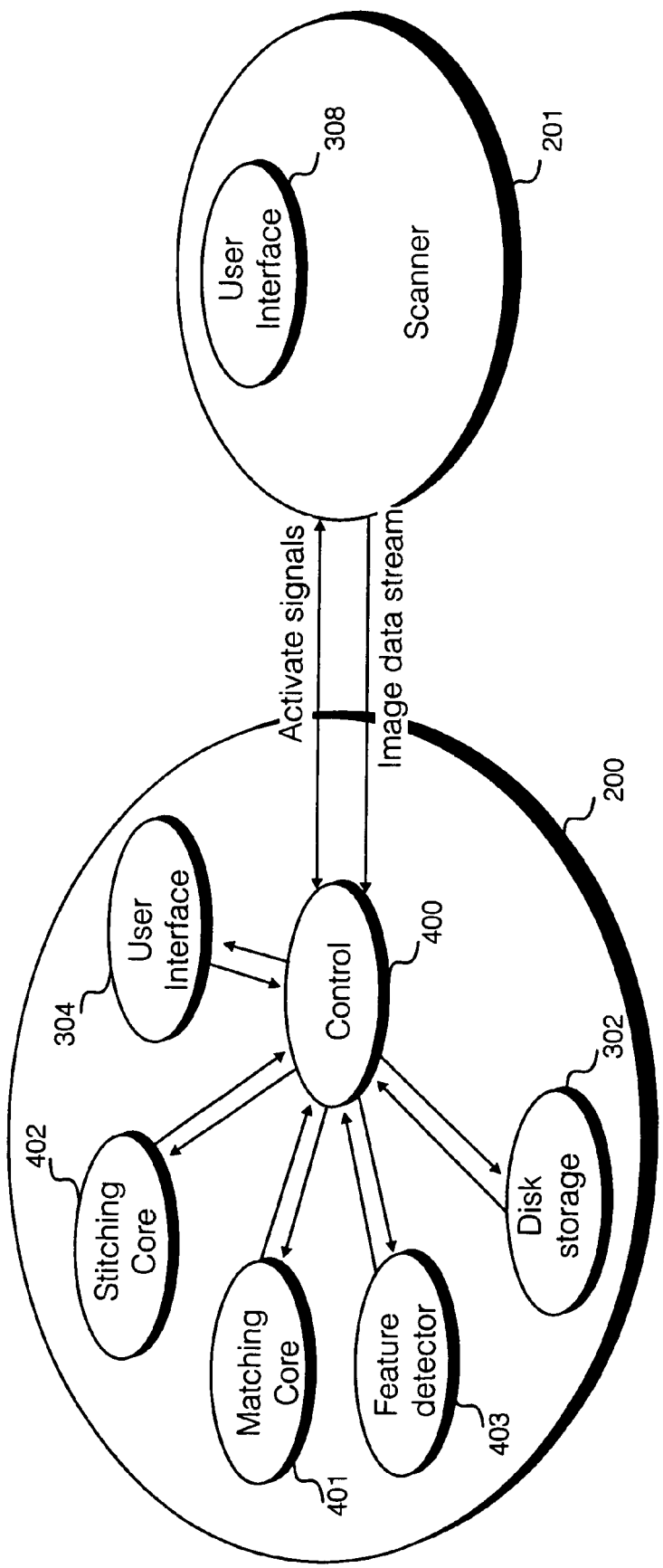
FIG. 4 illustrates schematically a logical architecture of the scanning system of FIG. 2 herein.

Referring to FIG. 4 herein, there is illustrated schematically a logical architecture of the scanning apparatus described with reference to FIG. 2 herein. Within the scanner 201, the user interface 308 comprises a plurality of activation switches provided on the casing 100 of the scanner device. The activation switches may include an activation switch for a two-scan operation involving two separate passes of the scanning head across the scan plate, and an activation key for a three-scan operation which involves three passes of the scan head across the scan plate. Additionally, there is provided a 'start' key for starting a scan operation, and there may be provided a 'scale' key which is depressed in order to scroll up or down on a display unit on the casing a percentage size enlargement or reduction of the scanned image. The user interface 308 in the scanner, whilst provided in the best mode implementation described herein, is not essential, and can be replaced by a mouse driven menu presented on the computer entity 200 in user interface component 304. In addition to user interface 304, and memory 302 which preferably comprises a disc storage memory, scan application 305 of the computing entity comprises a control component 400 for controlling operations of the scanner over a control cable interface between the computing entity and the scanner device 201; a matching algorithm 401 for matching first and second image data with each other, the first and second image data having overlapping portions; a stitching algorithm 402 for combining accurately a plurality of scan images received from scanner 201; and a feature detector 403 for detecting features of an image data to act as reference points.

Figure 5:
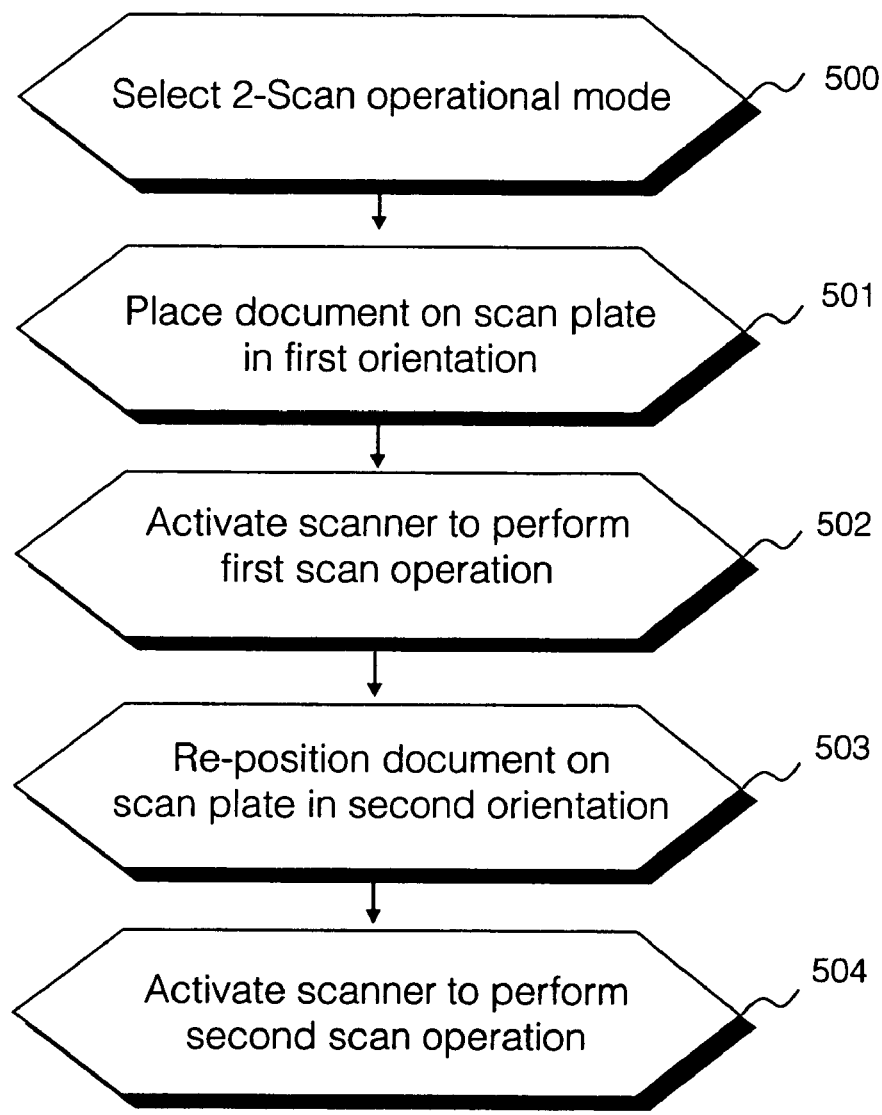
FIG. 5 illustrates schematically a two-scan use model for scanning an oversized US legal document on the scanning system illustrated in FIG. 2 herein according to a first specific implementation of the present invention.
Figure 6:
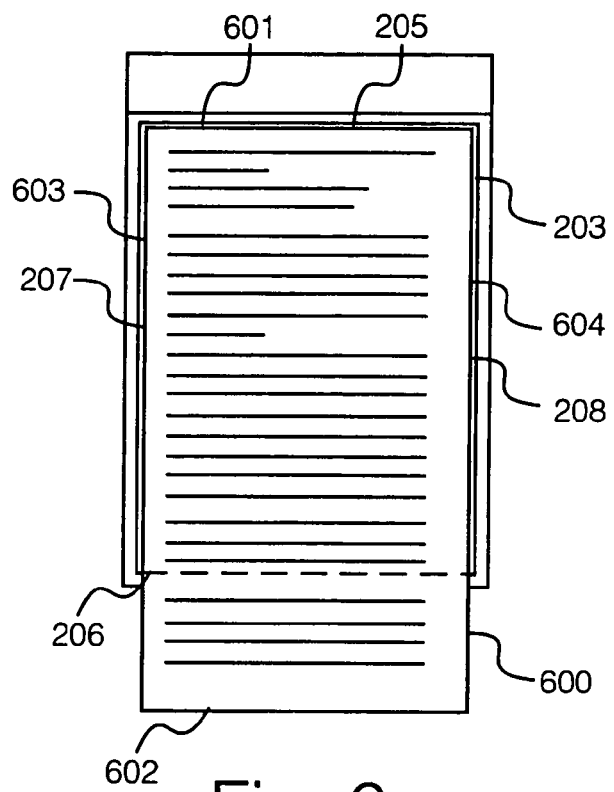
FIG. 6 illustrates schematically a first placement of a US legal document on a scan plate of the scanning system of FIG. 2 for producing a first image data according to the two-scan use model.
Figure 7:
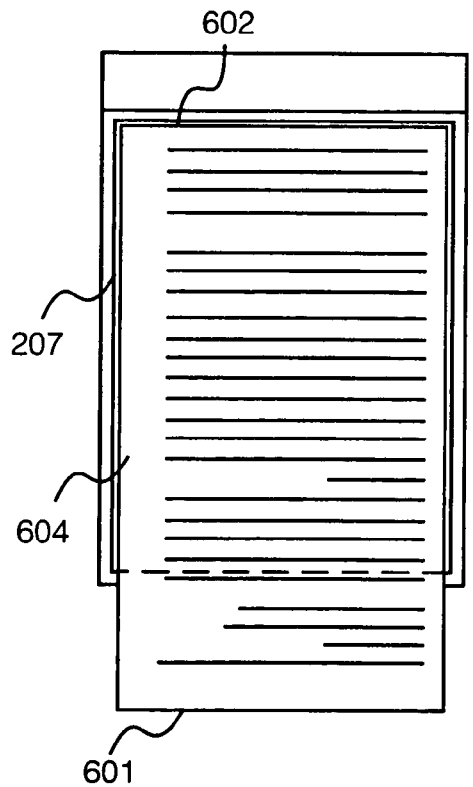
FIG. 7 illustrates schematically a second placement of a US legal document on the scanning plate of the system of FIG. 2 for producing a second image data according to the two-scan use model.

Referring to FIGS. 5 to 7 herein, there is illustrated schematically a first use model followed by a user of the scanning system of FIG. 2 herein for scanning an oversized document in two successive scan operations, with the document re-orientated on the scan plate between successive scans. In step 500 the user selects via the user interface 304 on the computer or the user interface 308 on the scanner, a two-scan mode of operation. In step 501, the user places the document 600 on the scan plate 203 of the scanner device in a first orientation as illustrated schematically in FIG. 6 herein. In the first orientation, the document is placed with an image recorded on the document face down onto the glass scan plate 203, with a first edge 601 of the document aligned with the first edge 205 of the scan plate, and a second edge 602 of the document, being opposite the first edge 601 overhanging the scan plate. A third edge 603 of the document extending between the first and second edges and extending in a direction transverse to the first and second edges is aligned with third edge 207 of the scan plate. A fourth edge 604 of the document, the fourth edge being opposite and parallel to the third document edge 603, is aligned parallel to the fourth edge 208 of the scan plate.

In step 502, the user activates the scanner to perform a scan operation, for example by activating a switch provided on the scanner casing 100 indicating a two-scan operation. The two-scan switch activation on user interface 308 calls up a program to operate a two-scan process as described herein after with reference to FIG. 9. The scanner proceeds to make a first scan of the document, producing a first image data. In step 503, the user repositions the document on the scan plate into a second orientation as illustrated schematically in FIG. 7 herein. In the second orientation, the first and second edges 601, 602 of the document are reversed respective to the scan plate, such that the second edge 602 of the document is adjacent the first edge 205 of the scan plate, and the first edge 601 of the document overhangs the scan plate. The fourth edge 604 of the document is adjacent the third edge 207 of the scan plate. The document is rotated 180° in the second orientation, relative to the first orientation. In step 504, the user activates the scanner to perform a second scan operation, for example by depressing a scan activation button on the scanner. The scanner scans the document in the second orientation, producing a second image data.

In a variation of the first use model illustrated in FIG. 5 herein, in step 503 the document is repositioned into a second orientation by sliding the document along the scan plate without rotation. Whereas in the first orientation, the first edge 601 of the document is aligned with the first edge 205 of the scan plate, and the second edge 602 of the document opposite the first edge 601 overhangs the scan plate, in the second orientation, the second edge 602 of the document is aligned with a second edge 206 of the scan plate, the second edge 206 being opposite the first edge 205 of the scan plate. The document is translated linearly relative to the scan plate in a direction parallel to a longer edge of the scan plate and in a direction parallel to a longer edge of the document.

In the first scan, a first image data corresponding to a first portion of the document which overlaps an active scan area of the scan plate is produced. In the second scan operation, a second image data corresponding to a second area of the document which overlaps the active scanner area of the scan plate is produced with the document in the second orientation. Because of the relative dimensions of the document to the active scan area of the scan plate, there is overlap of image data between the first image data and the second image data. The scanning system operates an algorithm which combines the first image data with the second image data, using the information common to both image data in the overlap region between the first image data and the second image data, to produce a combined image data representing the entire document. Production of the combined image data is automatic, and requires no further user intervention.

Figure 8:
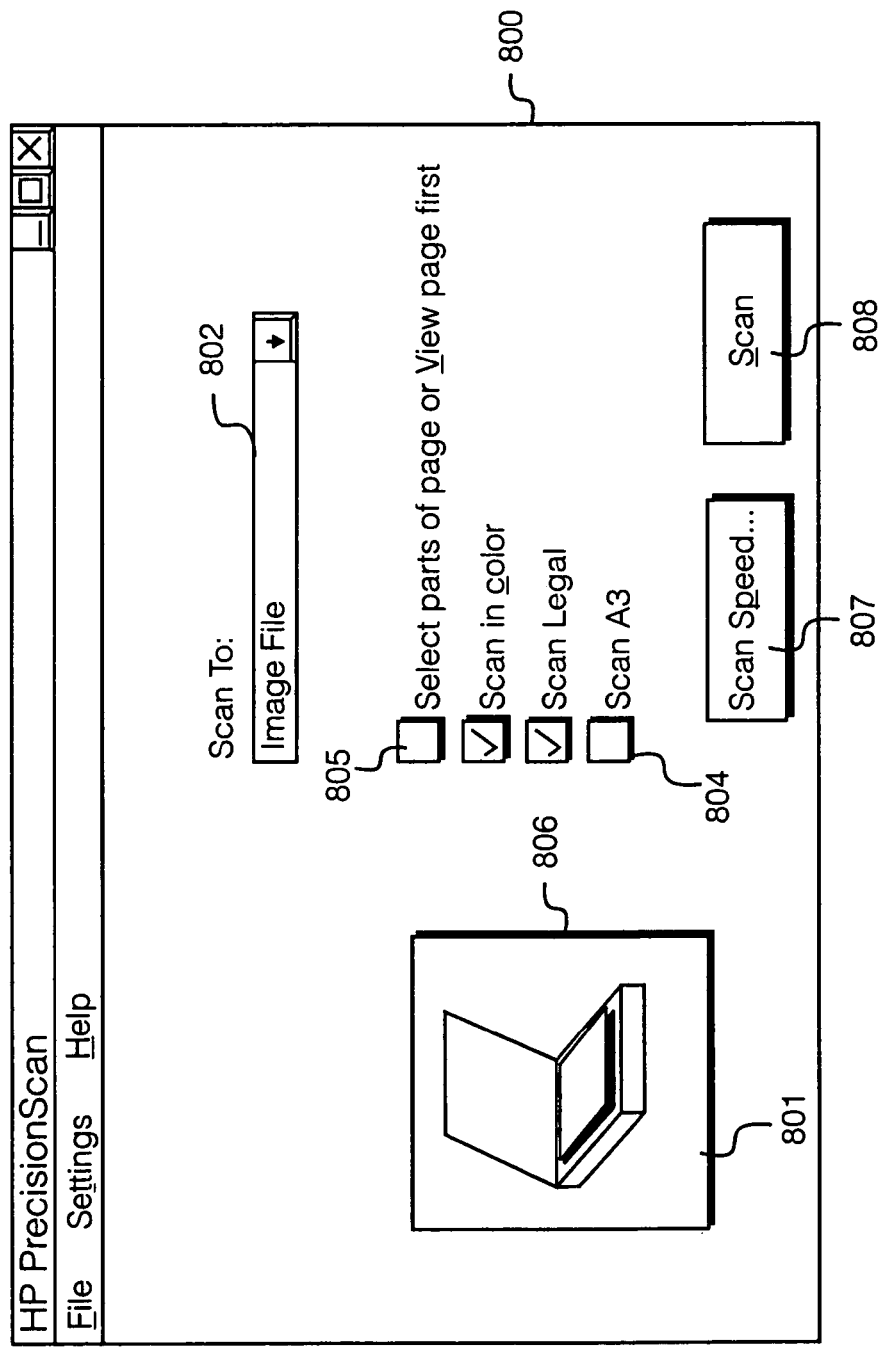
FIG. 8 illustrates schematically a first user interface display for selecting a two-scan operation or a three-scan operation of the scanning system of FIG. 2.

Referring to FIG. 8 herein, there is illustrated schematically a first display 800 presented on the user interface 304 of computer entity 200. The display 800 may be operated by a user as an alternative to the simple button user interface optionally provided on scanner device 201. The display, displayed on a monitor of the computer entity comprises a presentation of an orientation of a document relative to the scanner 801; a drop-down menu 802 having a set of possible destinations to which an image data of a document can be sent to; first and second dialog box displays 803, 804 indicating respective sizes of documents and consequently respective two or three scan operations of the system, for example scanning a US legal document 803, or scanning an A3 document 804; a dialog box display for selecting parts of a page or viewing a page prior to scanning 805; a selection box for scanning in color 806 an icon 807 for selecting a scan speed and a scan icon 808 for activating a scanning operation.

Figure 9:
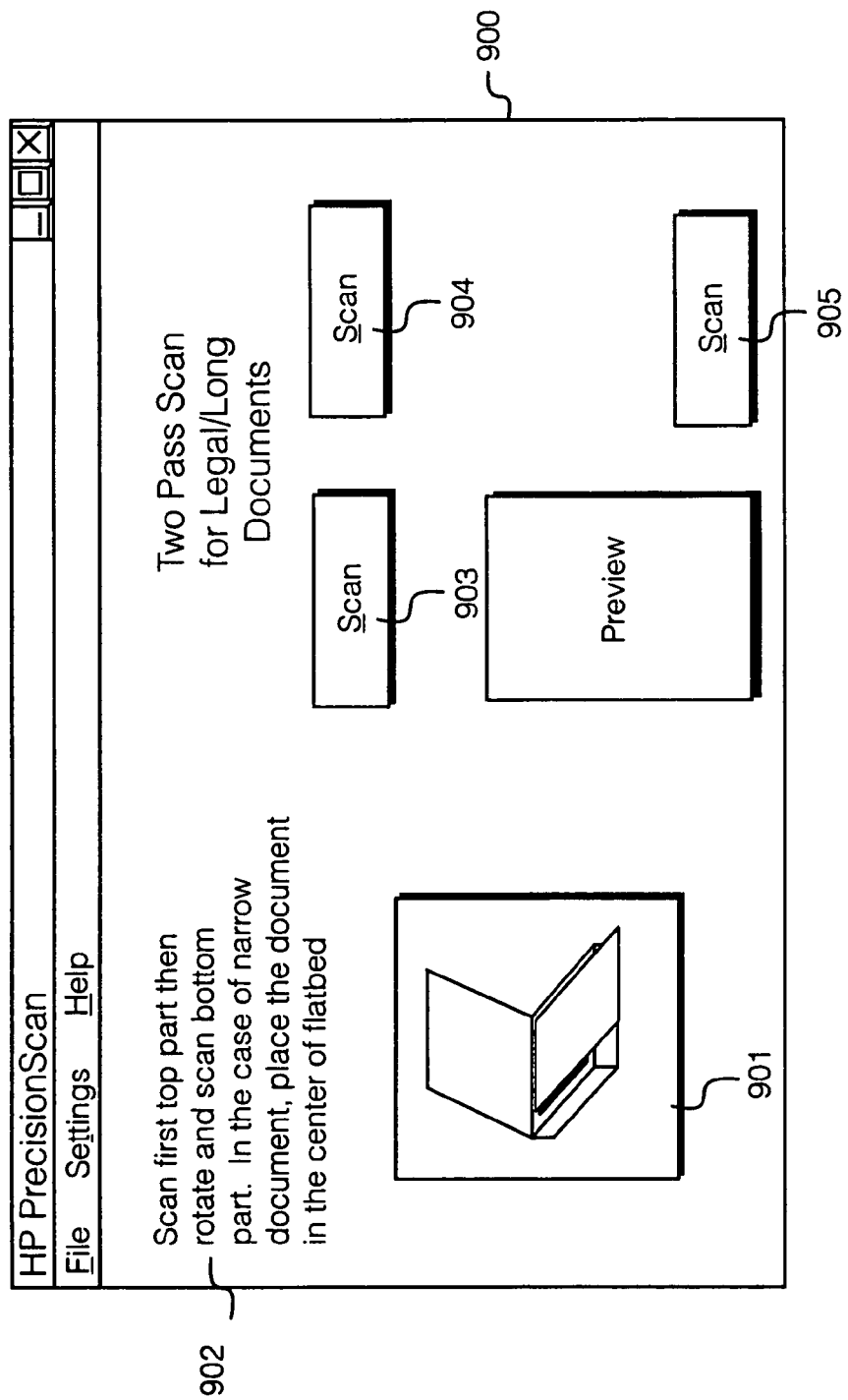
FIG. 9 illustrates schematically a second user interface display for using a two-scan operation of the scanning system of FIG. 2 herein.

On a user activating a scanning operation, having selected a document size, the first dialog box 800 is replaced by a second dialog box 900 as illustrated in FIG. 9 herein. The dialog box 900 is generated in the case of a two-scan operation for scanning legal documents by selection of two scan selection box 803. In the second dialog box 900, which appears once the first part of a two-scan mode of operation has been activated by activating scan icon 808 with a mouse or other pointing device, a graphical presentation of the scanner device and placement of the document on the scanner device in a second orientation in accordance with the first user model is displayed 901, together with instructions 902 for a two-scan mode of operation according to the first use model. A user may then follow the use model by activating a first scan of a document by placing a pointer icon over a 'scan top' icon 903 to obtain a first image data, after first having oriented the document in a first orientation according to first model, and then scanning the bottom of the document by activating a scan bottom icon 904 which activates scanning of a second image data from the document placed in the second orientation by the user. The user can cancel the operation at any time during the two-scan operation by activating cancel icon 905. A preview display 906 may be provided to allow the user a preview of the scanned first and/or second image data corresponding to the first and/or second orientations of the document, before those first and second images are saved to the file selected from file selection display 802.

Figure 10:
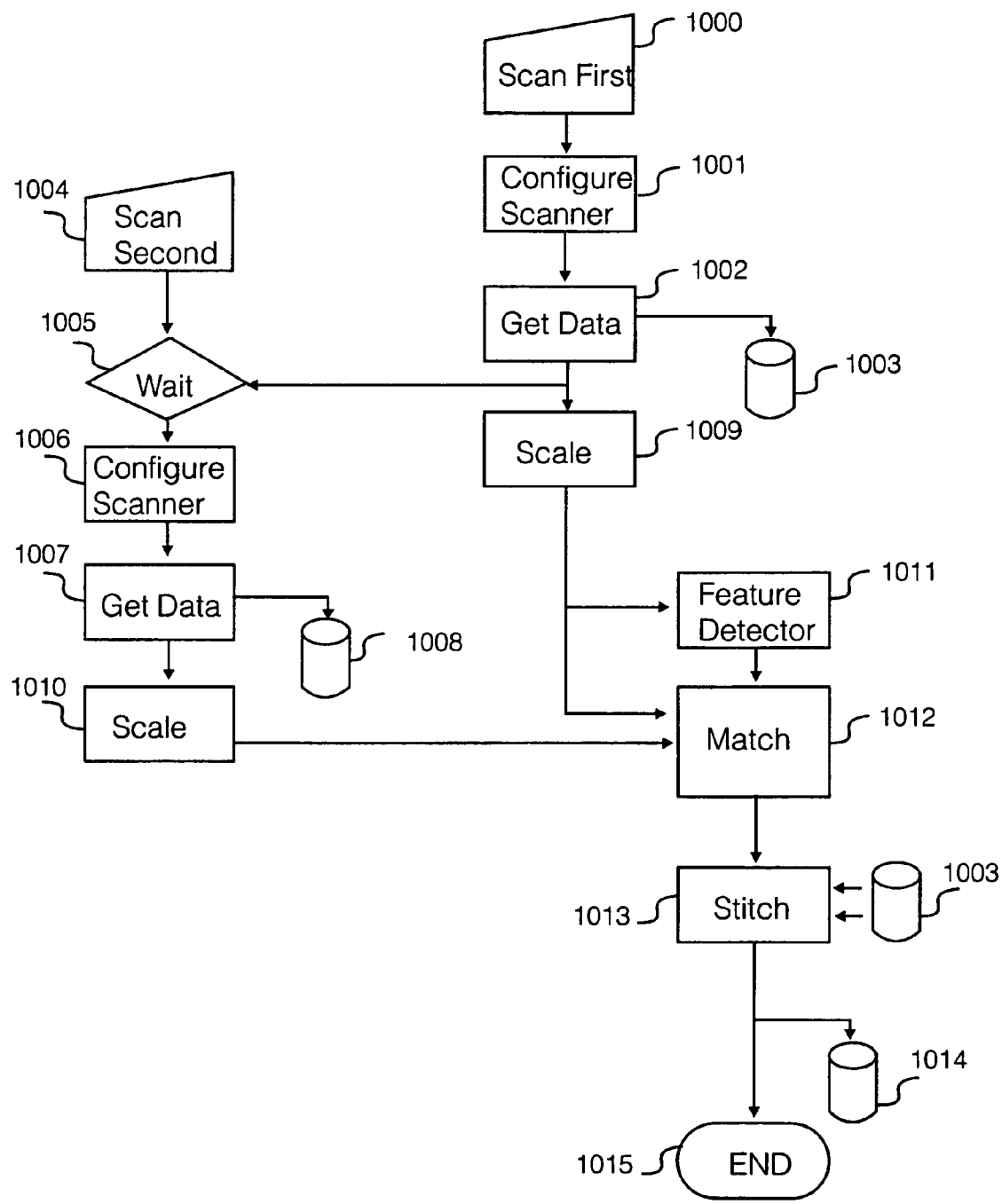
FIG. 10 illustrates schematically processes carried out by the scanning system of FIG. 2 in a first mode of operation for carrying out a two-scan image processing operation according to a first specific implementation of the present invention.

Referring to FIG. 10 herein, there is illustrated schematically a set of processes carried out by the scanning system of FIG. 2 in a two-scan image processing operation. In process 1000, the scanner performs a first scan operation of an image presented on the scan plate 203, corresponding with the document in the first orientation, where the user has oriented the document according to the two-scan user model described with reference to FIGS. 5 to 7 herein. In process 1001, the computing entity having received an activation signal from either the user interface 304 on the computing entity, or the user interface 308 on the scanner for setting a two-scan operation configures the scanner 201 via communications cable 209 for performing the selected two-scan operation. In the two-scan operation, the scanner makes a first pass of scan plate 203, resulting in a first image data obtained in process 1002. The image data is transported across the communications bus 209 into control component 400 of the computing entity which passes it to disc storage unit 302 for storage. The stored first image data from the first scan is illustrated schematically as data 1003 in FIG. 10 herein.

The user repositions the document according to the first use model into a second orientation as illustrated with reference to FIG. 7 herein. In process 1004, the user then activates a second scan pass of the scanner either by activating a 'scan' button provided on the casing of the scanner 201, or by activating the dialog box displays presented on the visual display unit of the computer entity. The algorithm waits until a user input is received or until a predetermined period has elapsed in step 1005 before reconfiguring the scanner in process 1006 to make a second scan pass, resulting in image capture in process 1007 of a second image data corresponding to a second portion of the document, as illustrated with reference to FIG. 7 herein. The second image data is stored in a second memory area represented 1008 in FIG. 10.

The first image data is adjusted in scale in first scaling process 1009. The first image data may be adjusted to a predetermined size in order to apply a transform to the data. Similarly, second image data is also scaled in second scaling process 1010. In detection process 1011 features of the first image, contained in the first image data are detected. Features of the first image data are required to be detected so that the first image data can be matched with the second image data in matching process 1012. In matching process 1012, a coarse matching occurs which identifies features which appear in both the first image data and the second image data. In stitching process 1013, having identified features appearing in both first and second image data, and matched those features, the first and second image data are stitched together by combining the first stored image data 1003 and the second stored image data 1008, resulting in a full image data 1014 which is stored in memory. The overall two-scan process is completed once the full image data comprising first and second image data stitched together has been obtained, in step 1015.

Figure 11:
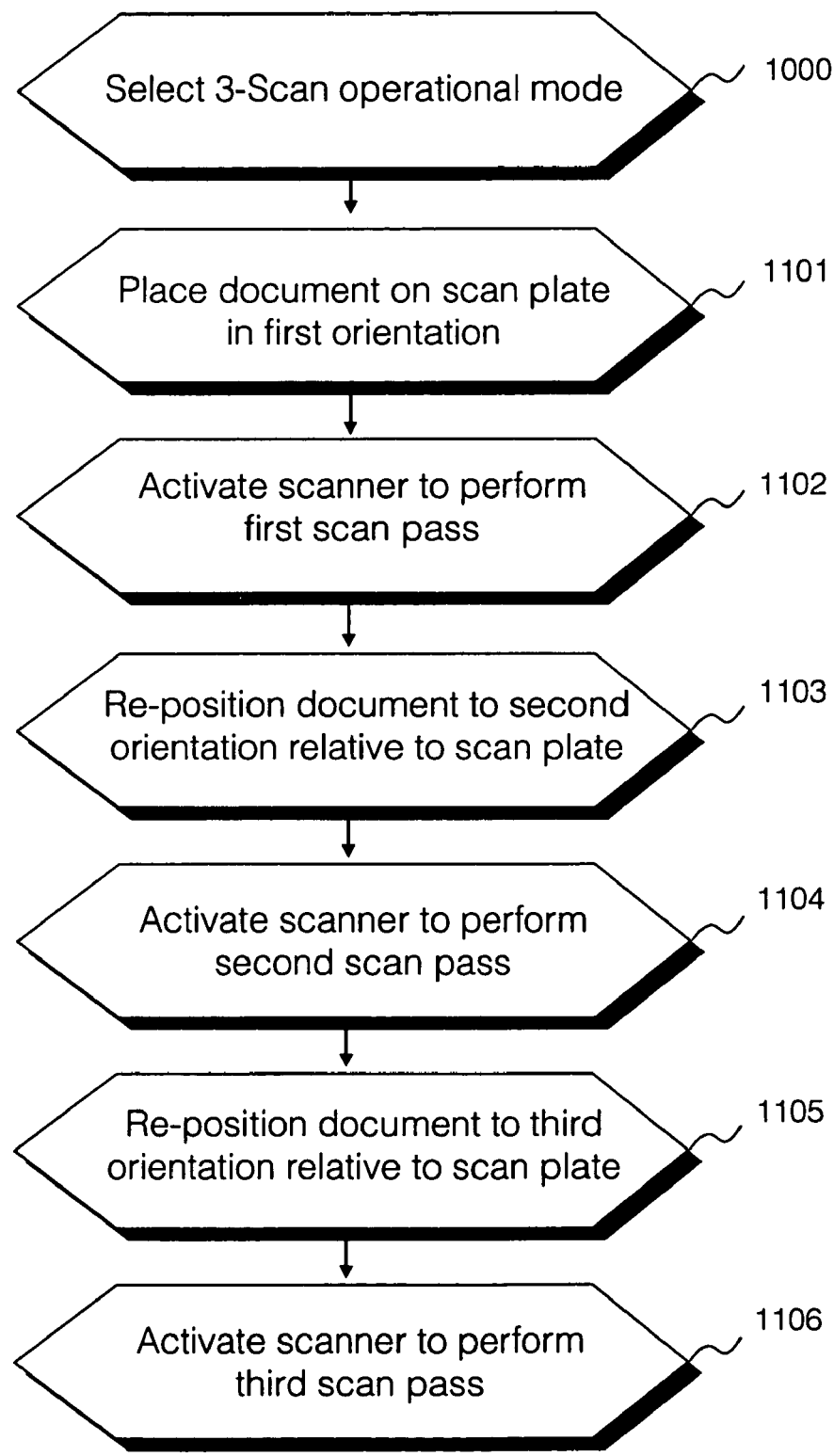
FIG. 11 illustrates schematically steps of a use model for carrying out a three-scan operation according to a second specific implementation of the present invention.

Referring to FIG. 11 herein, there is illustrated a second use model for a three-scan operation in which an oversized document A3 is scanned in three separate scan operations resulting in a first, second and third image data, which are then matched and stitched together by the scanning apparatus and system illustrated with reference to FIG. 2 herein.

In step 1100, a user selects a three-scan operational mode of the system by activation of either the user interface 304 on the computer, or the user interface 308 on the scanner device itself. Where the user selects the three-scan operational mode by the user interface on the computer, the user selects the scan A3 dialog box 804 on the visual display of FIG. 8 referred herein before. Where the user selects the three-scan process through the user interface 308 on the scanner, this is by activation of a single button switch. In step 1101, the user places the document on the scan plate of the scanner in a first orientation.

Figure 12:
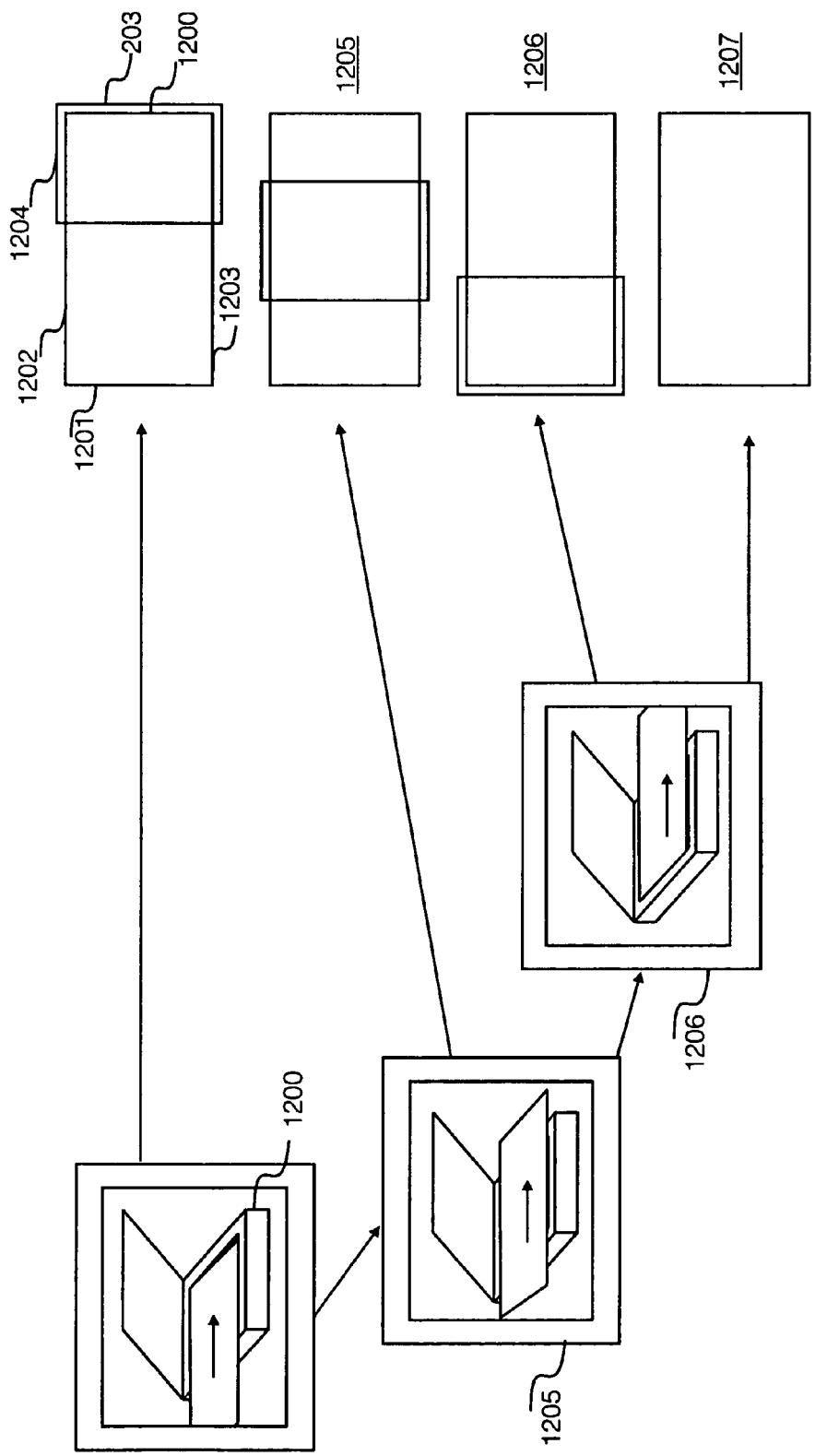
FIG. 12 illustrates schematically details of placement of an oversized document on a scan bed according to the three-scan use model.

Referring to FIG. 12 herein, the oversized A3 document comprises an upper edge 1200, a lower edge 1201 opposing said upper edge and parallel to said upper edge, a third edge 1202 and a fourth edge 1203, the third and fourth edges being parallel to each other and perpendicular to the first and second edges. A3 size documents are standardized to be exactly the same area as two A4 documents joined together. Therefore, for a scan plate designed to accept A4 documents and having a scan plate area slightly larger than the 21×29.7 cm quadrilateral area of an A4 document, capture of an image of the whole of a 42×29.7 cm A3 document requires three separate images of the A3 document to be scanned. The area of the scan plate is illustrated in FIG. 12 as rectangular area 1204. In the first orientation, the A3 document has its upper edge 1200 abutting a right-hand edge 1205 of the scan plate 203. The first image data captured by the first scan of the three-scan process corresponds to the area of the scan plate 1204, within which is captured part of the image of a first end of the A3 document.

In step 1103, the user repositions the document to a second orientation 1205 as illustrated schematically in FIG. 12 in which the A3 document is slid along the scan plate in a direction 900 to the main length of the scan plate, such that a central portion of the A3 document is positioned over the scan plate and scan area 1204. In the second orientation, upper and lowed edges 1200, 1201 respectively of the A3 document overhang the edges 207, 208 of the scan plate.

Third edge 1202 of the A3 document is placed closely to upper edge 205 of the scan plate, and the scan area 1204 extends either side of the third and fourth edges 1202, 1203 of the A3 document, such that the A3 document is of height dimension, less than a height dimension of the scan area 1204, whereas the A3 document is of width dimension greater than the width dimension of scan area 1204 as shown in FIG. 12 herein. In step 1104 the user activates the scanner to perform a second scan pass, by activating either the visual display unit display as will be understood from inspection of FIGS. 8 and 9 herein, or by activating a scan button provided as part of the user interface 308 on the scanner device itself. The scanner then proceeds to make a second scan pass in which a scan head of the scanner traverses across the scan area 1204 in a direction shown vertically in FIG. 12, passing between the third edge 1202 and the fourth edge 1203 of the A3 document. In step 1105, the user repositions the document to a third orientation relative to the scan plate. In the third orientation 1206 as shown schematically in FIG. 12 herein, the lower edge 1201 of the A3 document is placed abutting the third edge 207 of the scan plate, such that the scan area 1204 coincides with a lower area of the A3 document. Again, the third edge 1202 of the A3 document is placed abutting or close to first edge 205 of the scan plate 203. The third image data corresponds to data which is scanned in a third scan pass activated by the user by pressing the scan button or by activating an icon on the visual display unit in step 1106. The third image data overlaps a lower portion of the A3 document as shown in FIG. 12.

As will be appreciated, in the three pass scan operation, as with the two pass scan operation as herein before described, a user is not expected to place the document exactly aligning an edge of the scan area, but in practice there will be some variation of placement of the document over the scan area. In the first and second use models, since the user is prompted by instructions presented either on the visual display unit or the computer, or by instructions displayed on the scanner device, e.g. printed instructions attached to the scanner device or molded in the plastics casing of the scanner device, to place the document approximately according to the two-scan operation or the three-scan operation, this has advantages in image processing of the image data obtained in the two-scan and three-scan operations, in that algorithms attempting to match and stitch the separate portions of image data together have a limited search space in which to search for matching features between first and second image data to be stitched together.

The resulting image data from a three-scan operation, after image processing by a three-scan process as described with reference to FIG. 13 herein results in an image data describing the complete A3 document, combined from the first image data, second image data and third image data obtained from respective first, second and third scan passes of the scanner device according to the three-scan process.

Figure 13:
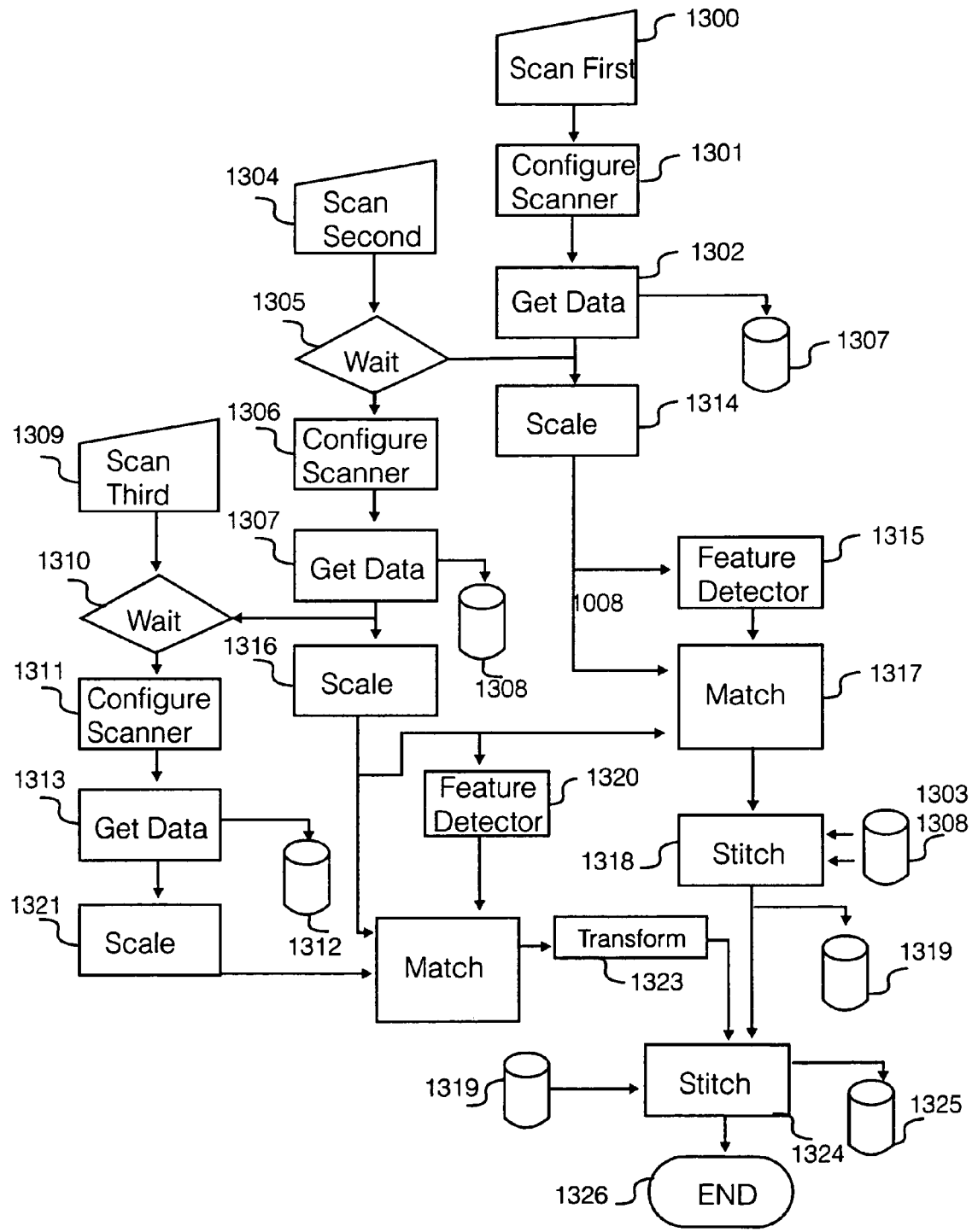
FIG. 13 illustrates schematically processes comprising a three-scan image capture and image processing operation implemented by the scanning system described with reference to FIG. 2 herein.

Referring to FIG. 13 herein, there are illustrated main process steps in a three-scan process which corresponds with the three-scan use model illustrated with reference to FIGS. 11 and 12. Once the system is configured into a three-scan mode of operation in step 1000, a first scan 1300 of the scanner is achieved by configuration of the scanner into the three-scan mode in process 1301 followed by obtaining a first image data in process 1302. The first image data is stored in a memory area 1303.

Meanwhile, the user reconfigures the document into the second orientation 1205 on the scan plate to commence a second scan 1304. In step 1305, the system waits in order to allow the user time to reposition the oversized A3 document into the second orientation. On receipt of a user input signal from the user interface, the scanner is configured for performing a second scan operation in process 1306, and in process 1307 the scanning components of the scanner traverse the scan plate to obtain a second image data 1308.

In a third scan operation 1309, after the second scan operation, the scanner waits for a second user input, received in response to an activation of a scan icon or button on the user interface in step 1310 and is configured to perform a third scan operation in process 1311. In the third operation the scanner obtains a third image data in 1312 in process 1313. At this stage, the scanning system has obtained a first image data corresponding to a first area of the oversized document, a second image data corresponding to a second area of the document, and a third image data corresponding to third area of the document, wherein there is overlap of data between the first image data, the second image data and the third image data.

Each of the first image data 1303, second image data 1308 and third image data 1312 undergoes further image processing by scan application 305 in the computer entity 200. The first image data 1303 is matched to second image data 1308, following which the first and second image data are stitched together. Processing of the first image data and second image data may occur sequentially, the first image data being processed before the second image data, or may occur in parallel. Preferably, for speed of implementation, parallel processing of the first image data and the second image data occurs. First image data 1303 is scaled in process 1314. The scaled image data is then subjected to a feature detector process 1315 in which features of the first image data which can be used to match the first image data with a second image data are identified.

Similarly, second image data 1308 is also scaled in second scale process 1316, and the scaled second image data is matched with the scaled first image data, using the detected features of the first image data in first match process 1317. The matched first and second image data are stitched together in first stitch process 1318 resulting in a combined first and second image data 1319.

The second image data, which has been scaled in second scale process 1316, is subjected to a second feature detector process 1317 to identify features of the second image data to facilitate matching the second image data with the third image data. The third image data is subjected to third scale process 1321 prior to being combined with the scaled second image data. In second match process 1322 the combined matched second and third image data undergoes a transform process in transform process 1323, prior to being stitched with the combined first and second image data 1319 in second stitching process 1324 which combined the third image data 1312 with the combined second and third image data 1319, utilizing the transform data produced from transform process 1323, resulting in a full image data 1325 prior to termination of the three scan-process in step 1326.

In a general case for processing a plurality of sets of image data of a document which is oversize for an A4/US letter sized scanning platform, matching of the image data together and stitching the image data once matched poses a problem of explosive complexity, requiring an unacceptably high amount of data processing power. Because the first and second use models described with reference to FIGS. 5 to 9 and FIGS. 11 and 12, and the two-scan and three-scan image processing operations described with reference to FIGS. 10 and 13 respectively herein give rise to known data flows, the internal logical and physical architecture of the image processing system described herein can be optimized for robustness, efficiency and performance. In the best mode implementation disclosed herein, optimum performance may be obtained for documents which can be captured using 3000×2000 pixel arrays (6 Mpixels), giving rise to approximately 24 Mbytes of data. Typical processing time for matching and stitching such documents may be of the order of 5 seconds using the implementations described herein where the use models described herein are followed by the user. For mass market image capture products having a large volume of sales, algorithms which are efficient and robust are required, and having a known data flow resulting from known predetermined use models enables optimization of hardware, firmware and software to achieve the performance objectives at a low cost.

Referring again to FIGS. 4 to 13 of the accompanying drawings, in a two or three scan operation by passing a first image data stream from scanner device 201 to control component 400, data processing steps of scaling the first image data and detecting features of the first image data can be carried out whilst a second image capture operation for capturing a second image data is taking place. Similarly, in a case of a three scan operation, matching of the first and second image data and stitching of the first and second image data together can be taking place whilst a third image capture operation is taking place. In general, processing of image data takes place, carried out by the processor of the computer entity, at the same time as capture of further image data by the scanning device, so that data processing occurs simultaneously and throughout the scanning operations, and whilst a user is re-orienting a document on the scanner, so that a time for data processing is not cumulatively added on to a time for following the use models described herein, but runs in parallel with a time taken for a user following the use models. Control component 400 passes image data to and from the stitching core component 402, matching core component 401, feature detector 403, and disc storage device 302 to perform the separate processes identified in FIGS. 10 and 13 herein, in parallel with a user carrying out the first and second use models for 2 and 3 scan operations respectively. Because the relative orientations of the plurality of sets of image data in a two or three scan operation are known, and overlapping data between first and second image data, and second and third image data, is within predetermined limits, provided the use models are followed by user, algorithms comprising the separate components of the stitching core 402, matching core 401, and feature detector 403 can be optimized, and a lay out and architecture of memory areas in disc storage memory device 302 can be engineered for optimum performance. Existence of the use models allows large reductions in data processing effort required for matching and stitching of images, compared to a case where first and second image data to be matched are captured in unknown orientations.

Figure 14:
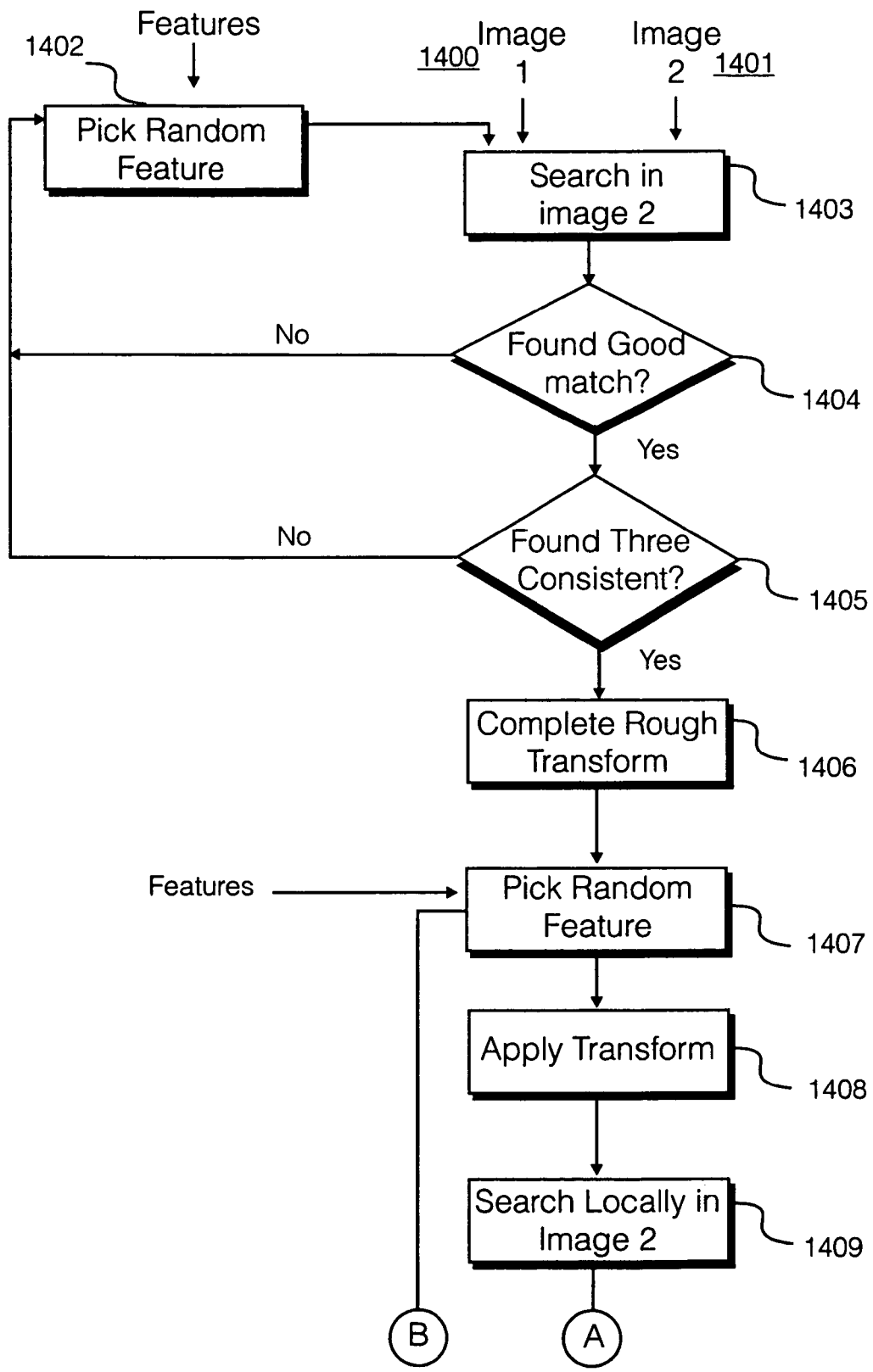
FIGS. 14 and 14b illustrate schematically a matching algorithm for finding a transform data for transforming a first captured image data in a first orientation onto a second captured image data in a second orientation.
Figure 14B:
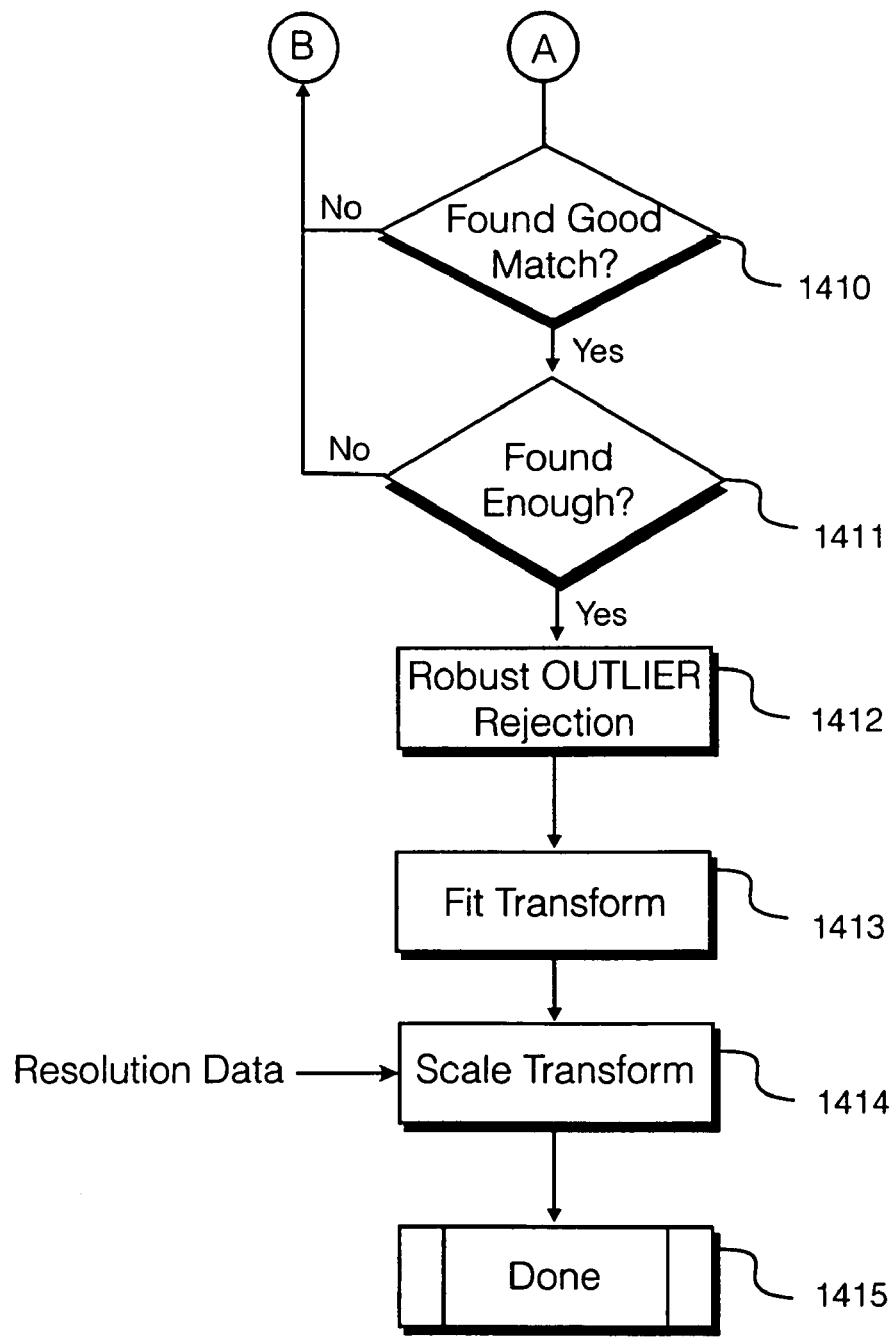

Referring to FIGS. 4, 14, and 14b herein, there is illustrated schematically operation of matching core component 401 which carries out matching processes for matching a pair of image data, as illustrated in items 1012, 1317, and 1322 in FIGS. 10 and 13 herein. The matching core comprises an algorithm in the form of a set of code instructions in a prior art programming language selected for optimization of data throughput and efficiency for performing image data processing steps. The matching core algorithm illustrated in FIGS. 14 and 14b herein produces as its output a transform data which transforms a second image data into a first image data. A particular pixel in the second image data is transformed to a corresponding respective pixel in the first image data by applying the transform which is the output of the matching core algorithm. A transform data output by the algorithm is in the form of a matrix data. Once the transform data is known for transforming the second image data into the first image data, the stitching core component 402 can combine the first and second image data, making use of the transform data.

Each of a plurality of pixels P1 in the first image, are matched with a corresponding respective plurality of pixels P2 in a second image, by a transform T, where:

Equation 1

$$P1 = [T]P2$$

Once the transform T is obtained by the matching core, the stitching core puts the overlapping pixels of the first and second images together.

First and second image data 1400, 1401 respectively, are matched, prior to undergoing a stitching process. First and second image data 1400, 1401 are input into the algorithm in a relatively low resolution, for example 75 to 100 dots per inch (dpi). The first and second image data are partially overlapping each other, that is to say first and second image data each contain a set of bytes of data which correspond to the same features of an image. Conversion of the image data stream produced from the scanner, which typically may have a resolution of 300 dpi is down converted by control component 400 to a lower resolution, for example 75 or 100 dpi, prior to sending the degraded resolution image data to matching core component 401. In the best mode described herein, a resolution of 75 dpi is preferred. Downgrading of resolution in the control component may be carried out by a known block averaging process, however other known processes may operate equally effectively. Reducing the resolution of the first and second images allows the feature detector process 1402 to perform more quickly than using a higher resolution data. However, using relatively low resolution image data does not result in reduced accuracy of feature detection or matching, because the algorithm of FIGS. 14 and 14b operates cumulatively, undergoing many passes through the algorithm in order to obtain a match. This is in contrast with the prior art methods, which require higher resolutions of 300 dpi upwards in order to obtain a similar accuracy to that which may be obtained in the present implementation described herein.

First and second image data 1400, 1401 are input into first search algorithm 1403 in monochrome format (black and white). Therefore, if originally captured first and second image data from the scanner are in color, then the first and second image data are passed through a grey level extraction process, which is known to those skilled in the art to obtain monochrome first and second image data 1400, 1401. The grey level data comprising first and second monochrome image data 1400, 1401 comprises 1 byte per pixel.

In feature selection process 1402 features of first image data 1400 are selected randomly. Particular types of features may be searched for, for example corners which appear in images, or similar distinguishing features. Preferably the features searched for are features involving a high degree of contrast in a small spatial distance. However, a feature can comprise any set of pixels which have a texture, that is to say where there are changes of intensity within the set of pixels selected. The first and second image data may be stored in memory as an array of pixels of data, such that a position of bytes of data in the array correspond with the relative positions of corresponding respective portions of the image which the bytes of data represent. The features are input into the feature selection process part of the algorithm 1402 at a relatively low resolution, for example 75 dpi, although in the general case, a range of resolution may be accommodated from 75 dpi up to 1200 dpi. In the best mode herein, optimum performance has been found with relatively low resolutions in the range 75–150 dpi. Whilst low resolutions are favored, high resolution inputs are not excluded.

The features are input into the feature selection process 1402 in the form of Cartesian co-ordinates, identifying features in terms of horizontal and vertical position relative to a datum of the image data, where particular features are found in the image data. The Cartesian co-ordinate feature data is generated by feature detector component 403.

As a further input to the matching core, data describing the resolution of the original captured first and second image data, for example 600 dpi must be input. Although the matching core algorithm can work on downgraded image resolutions of 75 dpi, the information concerning the original resolution of image is stored. The resolution data is input into scale transform component 1414.

In first searching step 1403, the second image data 1401 is searched using a correlation method to correlate features in the second image data with the randomly selected features of first image data selected in process 1402. In the second image data, an initial search area in which the selected feature is searched for is large. The search method also allows for a relative rotation of the searched for feature in the second image. Having found one of the random selected features in the second image data, the search routine then proceeds to input a further randomly selected feature data from random feature selection process 1402, and search for the second feature in the second image. The search routine may also search for further features in the second image data.

In step 1404, for each randomly selected feature of the first image data, it is checked whether the feature is a good match with a corresponding feature in the second image data found in step 1403. If the feature is not a good match, then the algorithm proceeds to select a new random feature in process 1402 and the first search process 1403 for the new random feature is repeated, searching for the new feature in the second image. This routine applies for each randomly selected feature which is searched for in the second image data. If in step 1405, three or more, but preferably three randomly selected features have been found, each having a good match between the first and second image data and the three matches are consistent with each other to a small degree of error, then the algorithm moves onto step 1406, in which it attempts to complete a rough transform. Using the assumption that if three randomly selected features are found to have a consistent transform with each other between the first and second images, then the matching of further randomly selected features will provide only an insignificantly marginal improvement on the certainty of transform. Consequently the algorithm is able to move on to attempt to complete a rough transform in step 1406 having expended a minimum data processing effort at that stage.

Computation of the transform commences once two matching features which have good consistency are found. It is known and expected from the use models described herein before, that the transform will be a linear rigid transform, and using this information allows the algorithm to proceed to compute the transform after two matching features have been found. Once three consistent matching features have been found, then there is almost 100% certainty that the matches are correct. The algorithm keeps looking for matches between features until it finds three consistent features in step 1405, at which stage a complete approximate transform can be obtained in step 1406. By consistent, it is meant that when taking a plurality of possible pairs of matches between features of the first image data and the second image data, the corresponding respective transformations computed between them are the same within a small degree of error.

Using three features are not enough to compute a precise transformation, therefore the transformation determined in step 1406 is only approximate. However, the present algorithm is able to proceed to obtain a rough approximate transform at a very early stage compared to prior art algorithms, which select many features before attempting computation of a transform. Since searching of features computationally is expensive, the method of the present algorithm up to the stage of obtaining a rough approximate translation is computationally efficient compared to prior art methods.

In step 1407, a further random feature is selected from random feature selection process 1402. In step 1408, the approximate transform determined in step 1406 is applied to the further selected feature leading to a transformed first image feature. If the approximate transform found were exact, this feature would match exactly a corresponding respective feature in the second image data. However, at this stage the transform is only approximate. In step 1409, a second search process is applied to search locally in the second image data in the immediate vicinity of the co-ordinates corresponding to the transformed further feature of the first image data. Because the search space in the second search process 1409 is very much smaller than the search space in first search process 1403, the second search process 1409 completes much faster than the first search process 1403. Obtaining the approximate transform in step 1406 effectively enables a search space in the second search process for further features to be very much reduced from that of the first search process 1403 for an initial three selected features, thereby dramatically reducing the amount of computational effort required to find further feature matches.

In step 1410, if a good match between the transformed further feature and a corresponding respective feature in the second image data is not found, then the algorithm proceeds to select a new further feature in step 1407 applying the approximate transform and performing a local search in steps 1408, 1409 respectively. However, if a good match between the transformed further feature of a first image data is found with a corresponding respective feature of the second image data in step 1410, then in step 1411, it is checked whether enough such further features have been found by comparing the number of successfully matched further features in step 1410 with a preset number of further features. This number may be selected experimentally or empirically and entered as a factory preset into the algorithm.

In step 1412 a robust outlier rejection algorithm process is applied to the plurality of further features. The outlier rejection algorithm 1412 further increases the accuracy of the approximate transform obtained in step 1406 by examining a plurality of all matched features, and rejecting any matched features which lie outside a pre-determined range. Prior art outlier rejection algorithms as will be known to those skilled in the art may be used to perform the outlier rejection process 1412.

Referring to FIG. 15, there is illustrated schematically in graphical representation, the operation of outlier rejection process 1412. If a plurality of matched features match a particular transform within fixed error limits as indicated by points surrounding line 1500, the line being a least median of squares fit of the points, but there are one or more outlying points, for example 1501 which distort the least median of squares fit, and which properly lies on a different transform represented by line 1502, then the robust outlier rejection algorithm rejects the outer most lying point 1502, enabling a better fit of the transform represented by line 1501 to the plurality of points lying within a fixed error range either side of the transform. Such techniques are well-known, for example in the book 'Robust Statistics' by P J Huber, published by Wiley, New York 1981. Poorly fitting outliers can skew the overall transform dramatically. Even a single outlier can skew a transform by one or two pixels. An error range outside which outlying points are rejected by the algorithm is preset into the robust outlier algorithm. The algorithm rejects all points outside a preset error range. Typically, there may be of the order of 100 matches used to obtain a least squares median fit in the best mode described herein.

Once the transform has been fitted to the plurality of selected matched features in step 1413 using the least squares median fit as described herein above, in step 1414 a scaling factor is applied to the transform. The transform applies to whatever scale of image has been captured. The final transformation data output comprises a 3×3 orthogonal matrix of the following form:

Equation 2

$$\begin{bmatrix} X \\ Y \\ 1 \end{bmatrix} \quad \text{Image 1}$$

$$\begin{bmatrix} X \\ Y \\ 1 \end{bmatrix} = \begin{bmatrix} \cos\theta & -\sin\theta & tx \\ \sin\theta & \cos\theta & ty \\ 0 & 0 & 1 \end{bmatrix} \quad \text{Image 2}$$

Where a pixel is expressed as [X, Y, 1]. The transformation is a rigid planar transformation. The transformation is of the form of an X-translation, a Y translation and a rotation θ.

The single most computationally expensive step in the matching core algorithm is the first search for features in the second image in step 1403.

Referring to FIGS. 16 to 20 herein, there will now be described in greater detail one specific implementation of first search algorithm 1403, and illustrating a set of data processing operations including patch rotation and adaption of patch size which contribute to computational efficiency of the algorithm.

Figure 16:
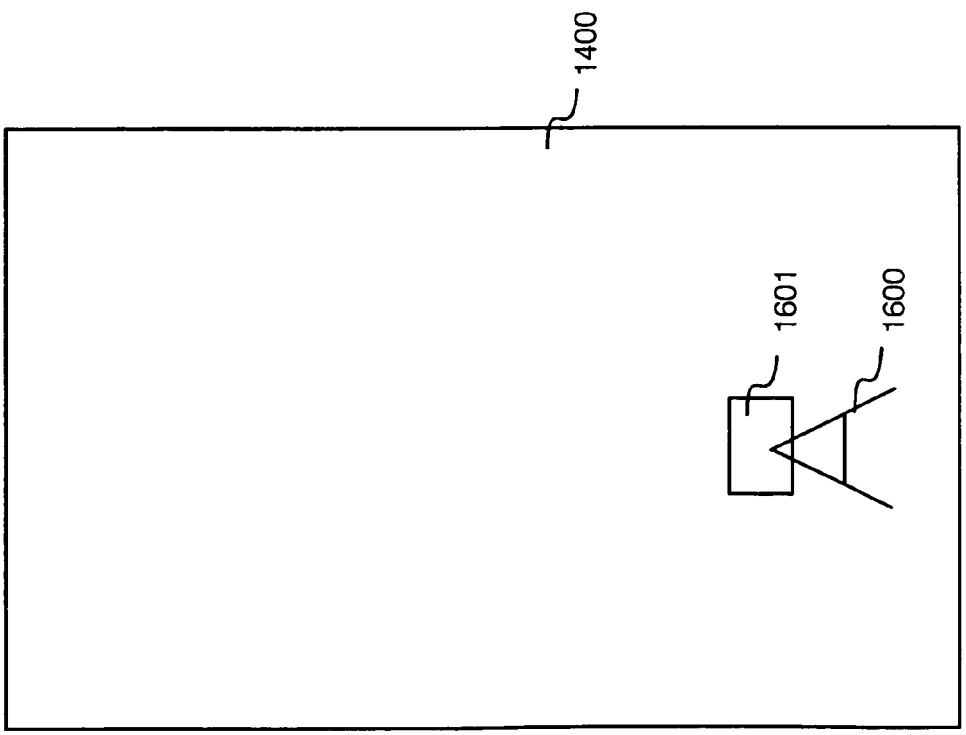
FIG. 16 illustrates schematically application of a pixel array patch over a feature in a first image data.

Referring to FIG. 16 herein, there is illustrated a first monochrome image data 1400 having a feature 1600, being an apex of a letter 'A'. The first search algorithm works by applying a source pixel array patch 1601 of a predetermined number of pixels height by a predetermined number of pixels width, e.g. 50×50 pixels containing a feature, and searching for the same feature in the second image data 1401 by rotating and transforming the 50×50 pixel source patch and searching for a correlation of intensity of each pixel of the source patch with a plurality of same size target pixel array patches across the whole of the second monochrome image data 1401, which may have a much larger area, for example 620×880 pixels in the case, where both first and second monochrome images are of resolution 75 dpi. Searching for selected features of the first image in the second image is achieved by cross-correlation of intensity of pixels of the first image with intensity of pixels of the second image.

Figure 17:
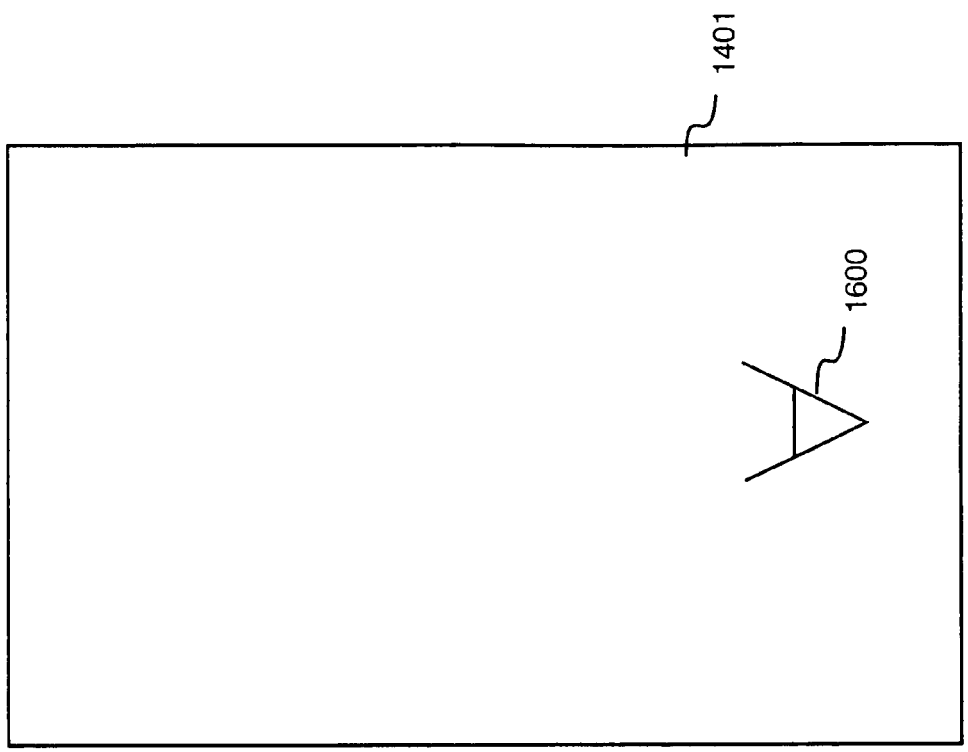
FIG. 17 illustrates schematically a second image data which contains the feature of FIG. 16.

Referring to FIG. 17 herein, there is illustrated schematically a second monochrome image data 1401 having the same feature 1600 in an area of image overlap between the first monochrome image data and the second monochrome image data. The object of the first search algorithm 1403 is to find matches between individual features in the first monochrome image data and the second monochrome image data.

Figure 18:
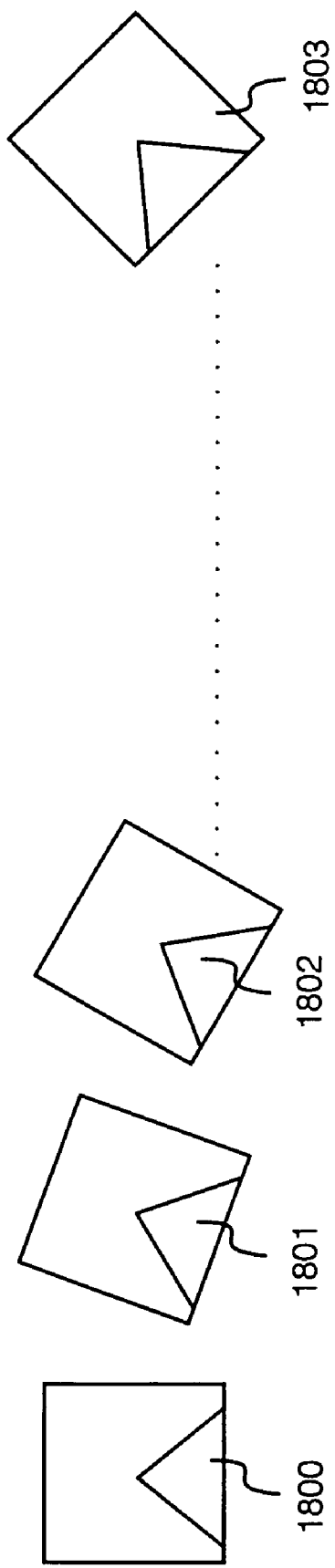
FIG. 18 illustrates schematically a pixel array patch rotation process used in a first search algorithm of the matching core algorithm of FIG. 14.

Referring to FIG. 18 herein, there is illustrated schematically a patch rotation process used to search for a feature of the first image data in the second image data. Successive rotations of the patch are applied as illustrated. Each rotated patch is compared with a similar size patch area e.g. 50×50 pixels in the second monochrome image data 1401 until a match is found. Whether or not the match is a good match or not depends upon a correlation value between intensity values of pixels in the patch data of the first image and a similar second patch area of the second monochrome image data. Each first patch data which contains a feature is applied and compared many times to the second image data until a good correlation can be found. If the source patch data has been compared with all pixels of the second monochrome image data, and a good target patch has not been found, then the algorithm proceeds to select a new feature. In the best mode herein, each source patch from the first monochrome image data is rotated in 10 different rotations. 5 anti-clockwise rotations are made and 5 clockwise rotations are made. For example, FIG. 18 shows a series of clockwise path rotations from a first unrotated position 1800 through first rotated position 1801, second rotated position 1802, etc. up to an $n^{th}$ rotated position 1803. Typically, clockwise rotations are each of the order 2° to 3°, and similarly for anti-clockwise rotations where the rotation is in the opposite direction. In the two scan image processing operation, in the second orientation the document is either shifted along the scan plate, or is rotated at 180°. Both of these orientations are assumed known in the algorithm. Where there is a 180° rotation, the whole second image data is rotated 180° prior to starting any other processing. After rotation, the second image data is treated in the same way as if the second image data resulted from a linearly translated document, which was captured in the second orientation. The range of rotations attempted in the best mode is in the range −20° (anti-clockwise) to +20° (clockwise). Rotation of the patches allows matching of first and second original captured image data where the document is not translated exactly linearly, or is not rotated by exactly 180°, and the edges of the document are not aligned exactly with edges of the scan plate.

The patch size is selected such that it is large enough to cover an expected feature size, but it is also small enough that the computational effort required to match the patch with the second monochrome image data is not excessive. In the best mode, a patch size of 50×50 pixels has found to be a good optimal compromise. The patch size must be small enough such that the correlation process is not confused by applying rotation to the patch, and by false matches to other features in the second monochrome image data. However, even an optimized 50×50 pixel array source patch, being matched with a plurality of 50×50 pixel array source patch areas in the second image data still involves a large amount of computation. Therefore, further heuristic algorithms are applied in search process 1403 in order to further reduce the amount of computation required to obtain a good match between features in the first monochrome image data and the second monochrome image data.

Figure 19:
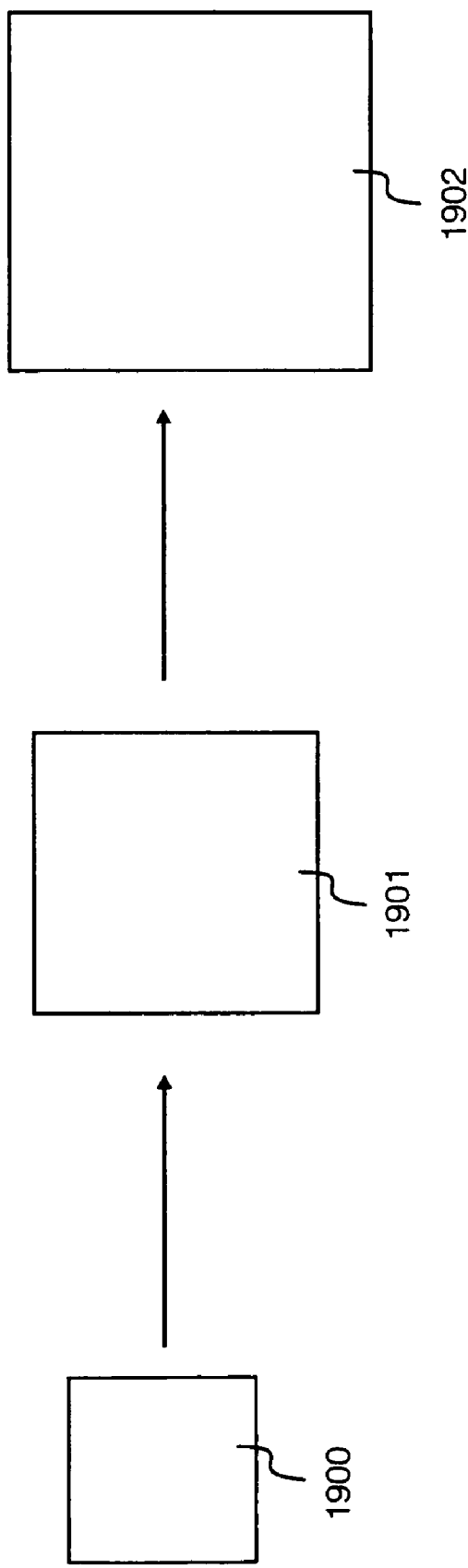
FIG. 19 illustrates a pixel array patch expansion method used in the first search algorithm.

Referring to FIG. 19 herein, there is illustrated schematically how a heuristic algorithm for providing an adaptive patch size operates within search process 1403. Initially, a first smaller patch size is applied 1900 having a lower number of pixels in a two dimensional array. If a good match cannot be found with the smallest patch size, then larger patch sizes 1901, 1902 having larger numbers of pixels are not attempted to be matched, and the algorithm goes on to select a different feature. However, if a satisfactory correlation is found between the first source patch from the first monochrome image data and a target patch in the second monochrome image data, then the first search algorithm increases the patch size, with the object of obtaining a better correlation over a larger patch size. The algorithm repeats minor variations, within a limited search space and attempts to match a second source patch area of larger size, with a corresponding increased second size target patch area in the second monochrome image data. If this match provides a correlation value above a second predetermined correlation amount, the algorithm proceeds to select a third patch size having more pixels than the first or second patch sizes and obtaining a correlation between that and the corresponding respective patch size in the second monochrome image data, in the restricted search space where the match for the smaller patch area had been found.

Figure 20:
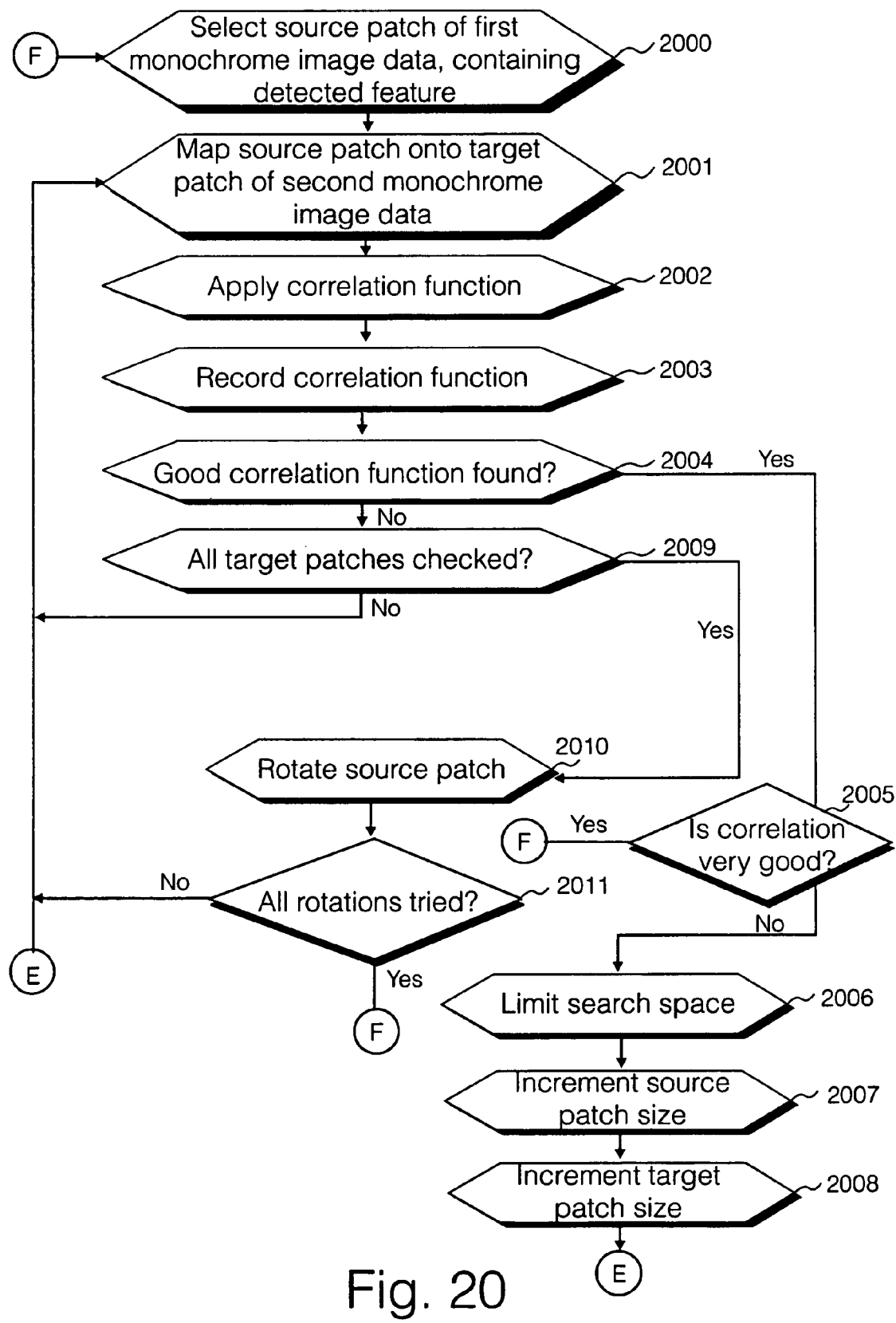
FIG. 20 illustrates schematically a specific implementation of the first search algorithm for finding features present in a first image data within a second image data.

Referring to FIG. 20 herein, there is illustrated schematically one implementation of first search process 1403. In step 2000, a source patch of a first pixel size is input from feature detector component 403. In step 2001, the algorithm maps the source patch on to a plurality of target patch areas within the monochrome image data. For each mapping, a correlation function is applied in step 2002 and an output of the correlation function is recorded in step 2003. If a good correlation function is found, having a result above a predetermined value for the first source patch size, in step 1404, then the algorithm immediately jumps to step 2006 to limit the search space around the target patch where an acceptable correlation result was obtained. The search space is limited to a predetermined area, smaller than the whole of the second monochrome image data, centered around the target patch for which a good match had been found in step 2004. The source patch size is incremented by inputting further data from the first monochrome image data corresponding to the X Y co-ordinates of the source patch. A target patch size within the search area is incremented in step 2008 and mapping of the source patch of incremented second size onto a plurality of target patches each of incremented second size within the reduced search area is applied in step 2001, and for each mapping a correlation function is applied in step 2002 and the output of the correlation function recorded in step 2003. Again, if a good correlation is found between second patch sizes, steps 2006, 2007 and 2008 are repeated to increment the source patch size and target patch size to a third patch size, and mapping of the source patch of incremented size source patch onto a plurality of incremented size target patches of similar size is applied as herein before described with reference to the second patch size. If the correlation found in step 2004 and tested in step 2005 is found to be very good, the algorithm does not further limit the search space in step 2006 but proceeds directly to select a new feature. This saves the computation incurred in steps 2006 to 2008, in cases where the found correlation is already very good.

However, if in step 2004 for the first patch size, a good correlation between source and target patches of the first patch size has not been found, and all target patches within the second monochrome image area have been checked, that is to say the whole second document image data has been scanned, then a second source patch of the first patch size, the second source patch containing a new feature, is input from feature detector component 403, and the whole process is repeated for the new feature.

If, in step 2004, a good correlation has not been found for the source patch of first size in its first orientation, and all target patches of the same rotation have been checked, then the algorithm proceeds in step 2007 to rotate the source patch and repeats step 2001–2004 until either a good correlation function has been found in which case the source and target patch sizes are incremented as herein before described to try and improve on the match, or until all source and target patches of that orientation have been tried in step 2009, in which case the algorithm proceeds to a further rotation as described with reference to FIG. 18 herein. The algorithm keeps searching, trying successive rotations until a good correlation function is found in step 2004. If a good correlation function, that is to say one having a correlation above the preset correlation limit cannot be found, then in step 2011 the algorithm proceeds to select a new feature, input from feature detector 403 and repeats the whole procedure.

If a very good correlation is found in step 2005, then further rotations of a patch are not searched for. The algorithm proceeds to the next feature as soon as it finds a good match. Rotation of a source patch in the search algorithm in 10 rotations requires 10 times more computation than for that particular source patch unrotated. Therefore, if a good match is found already without rotation, the algorithm saves computational effort by moving onto a new feature. Even though the source patch and target patch may not correlate exactly because they may be of different rotations, there are further robust layers within the matching algorithm which will overcome the mismatch of rotation.

The step of rotation of the source patch in step 2010 is also optimized. The algorithm has no predefined knowledge, other than that lent by the use model, of the expected rotation between first and second image data. However, the information provided by the fixed use model for either the two scan operation or the three scan operation can be advantageously used in reducing the number of computational operations required in the first search process 1403.

For example, with the two scan operation, it is known that the document is likely to be oriented 180° in the second image data compared with the first image data. Therefore, the rotation of the patch may commence about the already 180° rotated second image data. Any variations will be due to the document being not placed exactly 180° on the scan plate. This is a variable introduced by a user of the scanner, and the algorithm has no prior knowledge of any rotation other than 180° in this two scan operation. Therefore, rotations applied in succession to the (already rotated) second image data may be as follows in the two scan operation: 0°; −3°; +3°; −6°; +6°; etc., oscillating between clockwise and anti-clockwise rotations alternately such that small variations in either direction are tested before larger variations. This search strategy has the optimum chance of finding a rotation quickly, i.e. using a least amount of computational power.

In the version of the second scan operation in which the document is linearly translated between first and second image captures, patch rotations are applied to the second image data which remains unrotated with respect to the first image data, about clockwise and anti-clockwise oscillations of the order −3°; +3°; −6°; +6°; etc up to maximum oscillations of the order of −20° and +20°.

Similarly, for a three scan operation because the three scan use model directs a user to translating a large scale document across the scan plate, the source patch is initially unrotated with respect to the target patch, and rotations are applied −3°; +3°; −6°; +6°; etc. such that clockwise and anti-clockwise rotations of a smaller size are alternately tried before moving onto larger size rotations. As soon as a correlation having a good value above a predetermined correlation value is found, the algorithm stops and moves onto a new feature.

In terms of computational time, the search process 1403 is computationally most expensive. If done in an optimal manner, selecting an optimal patch size, optimal resolution of monochrome images, and optimum number of rotations and allowed extensive rotation, then a single fitting can take of the order of 1 second, running on a 200 MHz Intel Pentium Processor. However, if non-optimal values are selected, because of the large search space, then the whole algorithm may take of the order of minutes, for example 5 to 10 minutes in order to compute a match. For a practical commercial product, matching times of 5 seconds are acceptable, however matching times of minutes are unacceptable and lead to a practically unusable scanning system.

Optimization of a complete algorithm is achieved through a combination of individual optimizations. For example optimizing the resolution of the monochrome images, use of monochrome first and second image data in the first search algorithm, use of rotation of pixel array patches in the first search algorithm, selection of the number of rotations in each sense, i.e. clockwise or anti-clockwise in the first search algorithm, the fact that the algorithm moves on after having found three consistent matched features, and using many further matches each found quickly by using an approximate transform in steps 1407–1411.

Whilst in the above specific implementations, in a two-scan operation a US legal document is shown as being an oversized document relative to a scan plate designed for an A4 document requiring a two-scan operation, and an A3 document is illustrated as an example of a document requiring a three-scan operation for a scanner having a scan plate of area suitable for scanning an A4 size document in a single scan, the two-scan and three-scan implementations described herein are not restricted to such document sizes, but it will be understood by those skilled in the art that in principle any document which, relative to the area of the scan plate, requires two scans for coverage of its area may be captured in a two-scan operation as described herein, and any document which is of size relative to a scan plate area of a scanner such that the area the document can be captured in three scans of the scanner may be subjected to the three-scan operation as described herein.

Whilst a best mode embodiment described herein shows image processing carried out by programs resident on a personal computer device 200, the invention is not restricted to such location, but the functionality provided by the image processing algorithms described herein may be implemented on dedicated firmware provided within scanner device 201 as a stand alone product, such that an image data stream passed from the scanner device to a personal computer device may comprise a bit stream of image data representing a full image compiled from a plurality of subsidiary image data obtained in successive scans according to the use models described herein before.

What is claimed is:

1. A method of operating an image capture apparatus comprising at least one processor; at least one memory, and an image capture device having an image capture area in which images placed in said area are captured as digital image data, to capture a document image having physical area greater than said image capture area, said method comprising the steps of:

receiving an input instruction signal instructing said apparatus to adopt an image capture mode, in which said apparatus captures a first image data followed by a second image data;

capturing said first image data, said first image data corresponding with a first portion of said document;

capturing said second image data, said second image data corresponding with a second portion of said document, wherein said first and second portions of said document comprise a whole of one side of said document;

processing said first image data to adjust a scale of said first image data;

processing said first image data to detect features of said first image data;

processing said second image data to adjust a scale of said second image data;

matching said first image data with said second image data by randomly selecting a plurality of identifiable features in said first image data and searching said second image data for a corresponding plurality of identifiable features and calculating a transform for matching the first image data with the second image data based on pairs of identifiable features in said first image data and corresponding identifiable features in said second image data;

combining said first and second image data to produce a combined full image data representing said image having greater physical area than said image capture area.

2. The method as described in claim 1, further comprising the step of waiting for a user input after said capture of said first image data.

3. A method of operating an image capture apparatus comprising at least one processor, at least one memory, and an image capture device having an image capture area in which images placed in said area are captured as digital image data, to capture a document image having physical area greater than said image capture area, said method comprising the steps of:

receiving an input instruction signal instructing said apparatus to adopt an image capture mode in which said apparatus captures a first image data followed by a second image data followed by a third image data;

capturing said first image data, said first image data corresponding with a first portion of said document;

capturing a second image data, said second image data corresponding with a second portion of said document;

capturing a third image data, said third image data corresponding with a third portion of said document, wherein said first and second and third portions of said document comprise a whole of one side of said document;

processing said first image data to adjust a scale of said first image data;

processing said second image data to adjust a scale of said second image data;

processing said third image data to adjust a scale of said third image data;

processing said first image data to detect features of said first image data;

matching said first image data with said second image data;

combining said first image data and said second image data to produce a first combined image data;

processing said second image data to detect features of said second image data;

matching said second image data with said third image data;

applying a transform to said matched second and third image data to produce a transform image data;

combining said transform image data with said first combined image data to produce a combined image data representing said document image having area greater than said image capture area.

4. The method as claimed in claim 3, further comprising the step of, prior to said step of capturing a first image data, configuring said image capture apparatus to perform a first image capture operation.

5. The method as claimed in claim 3, further comprising the step of:

prior to said step of capturing a second image data, configuring said image capture apparatus to perform a second image capture operation.

6. The method as claimed in claim 3, further comprising the step of, prior to said step of capturing a third image data, configuring said image capture apparatus to perform a third image capture operation.

7. The method as claimed in claim 3, comprising the steps of:

after said step of capturing a first image data waiting for input of a first user signal before said step of capturing a second image data; and after said step of capturing a second image data waiting for input of a second user signal before said step of capturing a third image data.

8. The method as claimed in claim 3, wherein said step of processing said first image data to adjust a scale of said first image data occurs simultaneously with said step of capturing said second image data.

9. The method as claimed in claim 3, wherein said step of processing said second image data to adjust the scale of said second image data is carried out simultaneously with said step of capturing a third image data.

10. The method as claimed in claim 3, wherein said step of processing said first image data to detect features of said first image data is carried out simultaneously with said step of capturing a second image data.

11. The method as claimed in claim 3, wherein said step of processing said second image data to detect features of said second image data is carried out simultaneously with said step of capturing a third image data.

12. The method as claimed in claim 3, wherein a said step of matching a said image data with another said image data is carried out simultaneously with a said step of capturing a said image data.

13. A method of using a flat bed image capture apparatus having an image capture area in which images placed in said area are captured as digital image data, said image capture area being of a first substantially quadrilateral shape having first and second shorter edges opposing each other, and third and fourth longer edges opposing each other and extending between said first and second shorter edges, for capturing an image of an area of one side of a two sided document said area having a second substantially quadrilateral shape of area greater than said image capture area, said document area having first and second shorter document edges opposing each other, and third and fourth longer document edges opposing each other and extending between said first and second document edges, said method comprising the steps of:

positioning said document in a first orientation relative to said image capture area such that said first longest edge of said document is substantially parallel to said first shortest edge of said image capture area;

aligning said first shortest edge of said document with said first longest edge of said image capture area such that a first end portion of said document overlaps said image capture area;

activating said image capture apparatus to perform a first image capture operation for capturing a first image data of said document in said first orientation;

positioning said document in a second orientation in which said first longest edge of said document is substantially parallel to said first shortest edge of said image capture area, and a substantially central portion of said document overlaps said image capture area;

activating said image capture apparatus to perform a second image capture operation for capturing a second image data of said document in said second orientation;

positioning said document in a third orientation such that said first longest edge of said document is substantially parallel to said first shortest edge of said image capture area, and a said second shortest edge of said document lies adjacent said second longest edge of said image capture area, such that a third portion of said document corresponding to a second end of said document overlaps said image capture area; and activating said image capture apparatus to perform a third image capture operation for capturing a third image data of said document in said third orientation.

14. The method as claimed in claim 13, wherein said second and third orientations comprise linear translations of said document relative to said image capture area from said first orientation.

15. The method as claimed in claim 13, wherein:

said step of positioning said document in said first orientation is followed by said first activation step;

said second step of positioning said document follows said first activation step;

said second activation step follows said second positioning step;

said third positioning step follows said second activation step; and said third activation step follows said third positioning step.

16. An image capture apparatus comprising:

at least one data processor;

at least one memory;

a detector for capturing an image of an object presented in an image capture area of predetermined size;

a user interface for activating said detector to perform a series of image data capture operations, wherein said image capture apparatus can be activated at said user interface to perform an operation for capture of two successive images in series, and said image capture apparatus can be activated at said user interface to perform an operation for capture of three successive images in series;

an image processor for processing a plurality of successive said captured images to combine said plurality of successive images into a combined image data representing a full image, of which said plurality of image data are sub-images;

a feature detector for randomly detecting a plurality of features of a said image data;

a matcher for matching a first said image data with a second said image data; and a data combiner for combining a first said image data with a second said image data to produce a combined image data representing an image captured partially by said first image data and partially by said second image data.

17. The image capture apparatus as claimed in claim 16, wherein said user interface comprises a plurality of switches operable by a human hand.

18. The image capture apparatus as claimed in claim 16, wherein said user interface comprises:

a dialogue box displayed on a visual display unit, said dialogue box having selectable icons for selecting a two-step image capture process, and a three-step image capture process.

19. The apparatus as claimed in claim 16, wherein said user interface comprises a dialogue box displayed on a visual display unit comprising said apparatus, said visual display unit comprising;

an icon for activating a first image capture operation of a two-step image capture process;

an icon for operating a second image capture process of said two-step image capture operation;

a visual display representing a positioning of a document for a first step of said two-step image capture process; and a display representing a positioning of said document for a second step of said two-step image capture process.

20. The method as claimed in claim 16, wherein said user interface comprises a dialogue box presented on a visual display unit of said image capture apparatus, said dialogue box comprising;

an icon for activating a first step of a three-step image capture process;

an icon for activating a second step of a three-step image capture process;

an icon for activating a third step of said three-step image capture process;

a first icon representing graphically a positioning of a document on said image capture apparatus for performing said first step of said three-step image capture process;

a second icon representing a second positioning of said document for operation of a second step of said three-step image capture process; and a third icon representing a third positioning of said document for a third step of said three-step image capture process.

21. An image capture apparatus comprising:

at least one data processor;

at least one memory;

a detector for capturing an image of an object presented in an image capture area of predetermined size;

a user interface for activating said image capture means to perform a series of image data capture operations; wherein said data processor is adapted as an image processor for processing a succession of said captured images to combine said plurality of successive images into a combined image data representing a full image;

a feature detector for randomly detecting a plurality of features of a said image data;

a matcher for matching a first said image data with a second said image data; and a data combiner for combining a first said image data with a second said image data to produce a combined image data representing an image captured partially by said first image data and partially by said second image data.

* * * * *